(12) United States Patent
Heckel

(10) Patent No.: US 10,872,016 B2
(45) Date of Patent: Dec. 22, 2020

(54) HYBRID CLOUD METHODS, APPARATUS AND SYSTEMS FOR SECURE FILE SHARING AND SYNCHRONIZATION WITH BACKUP AND SERVER VIRTUALIZATION

(71) Applicant: Datto, Inc., Norwalk, CT (US)

(72) Inventor: Philipp Heckel, Ladenburg (DE)

(73) Assignee: DATTO, INC., Norwalk, CT (US)

( * ) Notice: Subject to any disclaimer, the term of this patent is extended or adjusted under 35 U.S.C. 154(b) by 104 days.

(21) Appl. No.: 15/737,167

(22) PCT Filed: Jun. 16, 2016

(86) PCT No.: PCT/US2016/037928
§ 371 (c)(1),
(2) Date: Dec. 15, 2017

(87) PCT Pub. No.: WO2016/205560
PCT Pub. Date: Dec. 22, 2016

(65) Prior Publication Data
US 2018/0159929 A1 Jun. 7, 2018

Related U.S. Application Data

(60) Provisional application No. 62/180,055, filed on Jun. 16, 2015.

(51) Int. Cl.
*G06F 11/14* (2006.01)
*H04L 29/12* (2006.01)
(Continued)

(52) U.S. Cl.
CPC .......... *G06F 11/1443* (2013.01); *H04L 29/04* (2013.01); *H04L 61/1511* (2013.01);
(Continued)

(58) Field of Classification Search
CPC . H04L 61/1511; H04L 63/0281; H04L 63/18; H04L 29/04; H04L 45/126;
(Continued)

(56) References Cited

U.S. PATENT DOCUMENTS 6,032,266 A     2/2000  Ichinohe et al.
7,039,828 B1 *  5/2006  Scott ................... G06F 11/1443
                                                    709/227

(Continued)

OTHER PUBLICATIONS

Stender et al., "Loosely Time-Synchronized Snapshots in Object-Based File Systems," 29th IEEE International Performance Computing and Communications Conference (IPCCC 2010), 10 pages (2010).

(Continued)

*Primary Examiner* — Kyung H Shin
(74) *Attorney, Agent, or Firm* — Fay Sharpe LLP

(57) ABSTRACT

Integrated File Sharing and Synchronization (FSS) and Backup Management and Storage (BMS) in a network appliance deployed behind a firewall and within a private trusted Local Area Network (LAN). The appliance processes backup image files of a LAN server's file system to generate fully constructed backup recovery points for the LAN server. Logical blocks for backup image files and associated recovery points may be stored locally on the appliance and redundantly in a trusted cloud domain, and a hypervisor on the appliance provides virtualization of the LAN server based on backup recovery points. A relay server cluster in the cloud facilitates reliable and secure access to the FSS services by remote client devices beyond the firewall, without changing fire wall rules, by employing HTTPS between remote client devices and the relay server cluster, and Secure Shell (SSH) tunneling between the cluster and the appliance behind the firewall.

20 Claims, 15 Drawing Sheets

(51) Int. Cl.
  *H04L 29/08* (2006.01)
  *H04L 29/06* (2006.01)
  *H04L 29/04* (2006.01)
  *H04W 12/06* (2009.01)

(52) U.S. Cl.
  CPC ............ *H04L 61/304* (2013.01); *H04L 63/02* (2013.01); *H04L 63/0281* (2013.01); *H04L 67/06* (2013.01); *H04L 67/1095* (2013.01); *H04L 67/2814* (2013.01); *H04W 12/06* (2013.01)

(58) Field of Classification Search
  CPC ... H04L 47/125; H04L 67/1023; H04L 67/02; H04L 67/06; H04L 67/2838; H04L 67/32; G06F 11/2028; G06F 11/1443
  See application file for complete search history.

(56) References Cited

U.S. PATENT DOCUMENTS

| | | |
|---|---|---|
| 7,139,926 B1 | 11/2006 | Madhav et al. |
| 7,657,871 B2 | 2/2010 | Velupillai |
| 7,953,883 B2 | 5/2011 | Thomas et al. |
| 8,432,701 B2 | 4/2013 | Katano |
| 8,806,032 B2 | 8/2014 | Van der Merwe et al. |
| 2003/0165144 A1 | 9/2003 | Wang |
| 2003/0198182 A1 | 10/2003 | Pegrum et al. |
| 2005/0138204 A1 | 6/2005 | Iyer et al. |
| 2007/0022418 A1 | 1/2007 | Velupillai |
| 2009/0037680 A1 | 2/2009 | Colbert et al. |
| 2010/0223364 A1* | 9/2010 | Wei ......................... H04L 29/04 709/220 |
| 2011/0010560 A1 | 1/2011 | Etchegoyen |
| 2012/0158976 A1 | 6/2012 | Van der Merwe et al. |
| 2012/0159475 A1 | 6/2012 | Abbondanzio et al. |
| 2012/0304170 A1 | 11/2012 | Morgan |
| 2013/0262862 A1 | 10/2013 | Hartley |
| 2014/0098671 A1 | 4/2014 | Raleigh et al. |
| 2014/0119176 A1 | 5/2014 | Cirkovic et al. |
| 2014/0247708 A1 | 9/2014 | Knox |
| 2014/0281355 A1 | 9/2014 | Trieu |
| 2015/0067819 A1* | 3/2015 | Shribman ............... H04L 67/06 726/12 |
| 2015/0133239 A1 | 5/2015 | Curtis |
| 2018/0077121 A1* | 3/2018 | Gordon ............... H04L 63/0281 |

OTHER PUBLICATIONS

"Create a reliable backup," © 2003-2018 Acronis International GmbH (8 pages) <https://www.acronis.com/en-us/personal/computer-backup/>.

Gildred, "The Best Image-Based Backup and Cloning Software of 2018," Cloudwards.net, last updated Feb. 22, 2018, 40 pages <https://www.cloudwards.net/best-disk-imaging-software/>.

International Search Report and Written Opinion for PCT Application No. PCT/US16/37928 dated Nov. 16, 2016 (18 pages).

Posey, "Backup challenges: Protecting large vols. Of data," TechTarget, 8 pages (Apr. 2014) <https://searchdatabackup.techtarget.com/feature/Backup-challenges-Protecting-large-volumes-of-data>.

* cited by examiner

HYBRID CLOUD METHODS, APPARATUS AND SYSTEMS FOR SECURE FILE SHARING AND SYNCHRONIZATION WITH BACKUP AND SERVER VIRTUALIZATION

CROSS-REFERENCES TO RELATED APPLICATIONS

This application is a U.S. National Stage application under 35 U.S.C. § 371 of International Patent Application No. PCT/US2016/037928, filed Jun. 16, 2016, which claims the benefit of and priority to U.S. Provisional Application Ser. No. 62/180,055, filed Jun. 16, 2015, entitled "Systems, Apparatus and Methods for Facilitating Comprehensive Data Backup Solutions," the entire content of each application and all appendices is hereby incorporated by reference herein in its entirety.

BACKGROUND

A local area network (LAN) is a computer network of interconnected computing devices within a relatively limited area such as a building (e.g., a residence, business, office building, research or academic setting, etc.). Related terms for computer networks within relatively limited areas and/or for particular purposes include personal area networks (PANs), campus area networks (CANs) and metropolitan area networks (MANs) (e.g., respectively corresponding to a room, campus, or specific metropolitan area). For purposes of the present disclosure, the term LAN is used generally to include local areas networks and other similar types of limited area/particular purpose networks such as PANs, CANs, and MANs.

A wide area network (WAN) generally covers a larger geographic area than a LAN. WANs are used to connect together multiple LANs and other types of computer networks (e.g., PANs, CANs, MANs), so that users and computers in one location can communicate with users and computers in other locations. A WAN often relies on leased telecommunication lines/circuits to transport information throughout the WAN and between LANs and other types of networks coupled to the WAN. In some instances, wireless communication interfaces (e.g., 3G technology, 4G technology, 4G LTE technology) may be used to communicatively couple computing devices and LANs to a WAN, different portions/components of a WAN to each other, or multiple WANs. The Internet is generally considered to be a WAN. More specifically, the Internet is the global system of interconnected computer networks (e.g., a "network of networks," including private networks, public networks, academic networks, business networks, government networks) that use the Internet protocol suite (TCP/IP) to link billions of devices worldwide via a broad array of electronic, wireless, and optical networking technologies.

A "router," also referred to herein as a "routing device" or an "integrated services adapter" (ISA), is a computer networking device that facilitates the transfer of electronic information (e.g., in the form of data packets) between computer networks (e.g., between a LAN and the Internet, between different portions of a WAN, etc.). In general, a router performs the important function of directing information traffic on the Internet; a data packet is typically forwarded from one router coupled to the Internet to another router coupled to the Internet, until the data packet reaches its intended destination.

More specifically, when a data packet is received by a router, the router reads Internet Protocol (IP) address information in the data packet to determine its ultimate destination (ultimate destination IP address). Then, using information maintained in a routing table (or routing policy) of the router, the router directs the data packet to another router coupled to the Internet (which may be an intermediate network node along the packet's journey toward the ultimate destination, or the ultimate destination itself for the data packet). To this end, a router typically includes one or more WAN communication interfaces to facilitate coupling of the router to different physical media types used for WAN connectivity (e.g., copper cables, fiber optic cables, wireless communication links). Some examples of conventional routers include home and small office routers that pass data (e.g., web pages, email, instant messages/text, and videos) between home/office computing devices and the Internet. Other examples include enterprise routers that connect large business or Internet Service Provider (ISP) networks up to core routers, and the core routers in turn forward data at high speed along optical fiber lines.

In some instances in which a router is employed to couple a LAN (including multiple computing devices) to the Internet, the router employs network address translation (NAT) to share a single IP address for the LAN (e.g., provided by an Internet Service Provider) among the multiple computing devices in the LAN. When incoming traffic from the Internet reaches the LAN router but does not carry the IP address for the LAN (the traffic is not intended for the LAN), as noted above the router may redirect the incoming traffic according to a routing table or routing policy. In this manner, the NAT performed by the router serves as a type of "firewall" that prevents unintended incoming traffic from reaching the computing devices inside a LAN.

More generally, a "firewall" is a network security system that monitors and controls incoming and outgoing traffic to and from a network (e.g., a LAN) based on predetermined security rules. Thus, a firewall typically establishes a barrier between a trusted, secure internal (e.g., private) network and another outside network, such as the Internet, that is assumed not to be secure or trusted. There are various types of conventional hardware and software firewalls; again, as noted above, in some instances a router serves as a type of firewall for a LAN.

With respect to LANs, many business organizations own/operate their own LAN (or multiple LANs) to support their electronic business information and communication needs. Often times such LANs include one or more "servers," which are computer programs or computing devices that manage network resources, such as providing various types of functionality for other "client" programs or devices in the LAN. Common examples of server types found in LANs for business organizations include, but are not limited to, email servers, network servers (to manage network traffic), application servers, FTP servers, file servers, fax servers, and print servers. Servers are often dedicated, meaning that they perform specific tasks and provide specific functionality. In some instances, a single computing device can implement multiple servers providing respective functional services (e.g., various applications, email, network, FTP, file, and/or print services) to multiple client computing devices in the LAN.

The devices, infrastructure and functionality constituting a LAN for a business organization may be managed and maintained locally (e.g., by dedicated information technology (IT) staff employed by the business organization). Additionally or alternatively, IT administration for a LAN may be contracted to a third-party IT service provider; for example, a LAN that is owned/operated by a business organization may be remotely managed by a "Managed Service Provider" (MSP) that provides IT services to the business organization (e.g., in some instances under a subscription model). An MSP often provides IT services remotely (e.g., via the Internet) to multiple business organizations that own/operate respective LANs (e.g., by accessing equipment and infrastructure constituting a given LAN via routers that respectively connect the MSP and the given LAN to the Internet).

SUMMARY

In one example area of commercial endeavor, the Applicant provides products and services for business continuity, planning and disaster recovery (e.g., to ensure that an organization's critical business functions will either continue to operate despite serious incidents or disasters that might otherwise have interrupted them, or will be recovered to an operational state within a reasonably short time period). One focus area for such products and services relates to backup and restoration of electronic business data for small-to-medium-sized businesses (SMBs).

In some commercial implementations, the Applicant provides business continuity products and services to Managed Service Providers (MSPs), who in turn provide third-party IT services (based in part on the Applicant's business continuity products and services) to various business organizations such as SMBs. For purposes of the present disclosure, the business organizations to which MSPs provide third-party IT services are referred to herein as "end-user business organizations" (or, more simply, "end-users"), which may include various types of SMBs.

FIG. 1 illustrates an example commercial implementation of an MSP providing IT services to SMB end-users that maintain (e.g., own/operate) one or more LANs to support their electronic business information and communication needs. In FIG. 1, a first end-user LAN 200A includes one or more servers (LAN1SA, 204A; LAN1SB, 204B; LAN1SC, 204C) to provide various functional services to client computing devices in the LAN (LAN1CA, 206A; LAN1CB, 206B), as well as one or more routers 208A to couple the LAN 200A to a WAN (e.g., the Internet 400). A given MSP 50 may provide its services to a customer base constituted by multiple end-users; accordingly, the MSP 50 may be responsible for providing its IT services to multiple LANs 200A and 200B, wherein each LAN includes various computing and networking equipment (including one or more servers, client devices and routers) to provide electronic business information and communication infrastructure and functionality for a particular end-user.

To support the efforts of multiple MSPs each serving multiple end-users, the Applicant provides, as part of its product suite, backup/restore devices that an MSP may deploy in the LANs of one or more of its end-users to facilitate business continuity functionality. FIG. 1 also shows such backup/restore devices, also referred to as a "backup management and storage" (BMS) apparatuses 22A and 22B, respectively deployed in each of the LANs 200A and 200B. The deployed backup/restore devices in respective end-user LANs implement various functionality for effective image-based backup of an end-user's business data (wherever this business data may be stored), both locally on the backup/restore device in the LAN as well as to a secure cloud storage infrastructure maintained and operated by the Applicant (e.g., trusted backup storage domain 500). The deployed BMS apparatuses 22A and 22B also facilitate restoration of backed-up business data to the appropriate end-user, either from local storage on the respective apparatuses or from the Applicant's secure cloud storage infrastructure. The Applicant also provides to each MSP, as part of its service offerings, secure web-based access to one or more Device Management Servers (DMSs) and other computing infrastructure, hosted in the trusted backup storage domain 500, to enable each MSP to remotely administer (e.g., configure and monitor operation of), in a secure and centralized manner, the various BMS apparatuses that the MSP has deployed in the multiple end-user LANs for which it provides IT services. In exemplary implementations, the Applicant provides such access to secure centralized remote administration of multiple and geographically distributed deployed BMS apparatuses via a web portal including multiple graphical user interfaces or GUIs, provided by one or more DMSs hosted in the domain 500, to facilitate configuration and monitoring by the MSP 50 of deployed BMS apparatuses 22A and 22B in the LANs 200A and 200B.

In the context of SMBs of various types, the Applicant has also recognized and appreciated that SMBs as well as larger business enterprises increasingly rely on and benefit from file sharing and synchronization services for authorized users in their LANs. For purposes of the present disclosure, "file sharing and synchronization" (FSS) refers to various capabilities that enable authorized users to share and synchronize documents, photos, videos and other files across multiple computing devices. FSS services allow multiple different users to edit a given file as needed (in essentially real-time), distribute edited files to various users, and synchronize different versions of a given file on different computing devices.

Conventionally, FSS services allow users to save files in cloud or on-premises storage in a "data repository" via an FSS server application. The centrally-stored files may then be accessed on other desktop and mobile computing devices (PCs, tablets, smartphones) that support the FSS application, and the files also may be shared with other authorized FSS users. For example, an SMB may run an FSS server application on-premises or in the cloud, and authorized SMB employees may access files stored in the FSS server data repository from a variety of FSS client computing devices (either on the SMB premises, or using remote client computing devices). Accordingly, FSS services between a server application for the data repository and multiple client computing devices conventionally require that the FSS server application be accessible by a public IP address. In particular, with a cloud deployment, SMB employees using a PC or mobile client computing device require network connectivity to remotely access the FSS server application via a public IP address so as to save, access, share, and/or synchronize files in the FSS server application's cloud data repository. Also, in situations where the FSS server application and data repository is on-premises for an SMB, authorized remote FSS users would still need to gain access to the FSS server and data repository via the Internet using a public IP address.

The Applicant has further recognized and appreciated that while FSS services may enhance business operations for some SMBs and other business enterprises, the conventional requirement for a public IP address to implement FSS services presents a significant vulnerability by exposing businesses to serious data security risks. While some conventional FSS offerings include user authentication, data encryption and data tracking features in an effort to protect business data, not all offerings include data encryption—and again, the requirement for a public IP address to access an FSS server and data repository, even using data encryption techniques, presents a significant security gap in the IT infrastructure of a business organization.

In the context of Applicant's various product and service offerings to MSPs and their end-user SMBs, the Applicant has appreciated that exposing an unsecure public access hole in the firewall of a private and trusted SMB LAN to provide FSS services is an untenable solution for SMBs and their MSPs who are responsible for IT infrastructure security and maintenance. Similarly, deploying FSS services behind the firewall of a private and trusted LAN without providing a public IP address to access the FSS services essentially precludes access to these services by remote users/employees (without significant network/firewall reconfiguration).

In view of the foregoing conundrum, the present disclosure contemplates various inventive concepts that allow SMBs and other business enterprises to securely deploy FSS services within their private and trusted LANs while simultaneously providing ready access to the FSS services by authorized remote users outside of the LAN—and without exposing the LAN to significant security risks. More generally, some of the inventive concepts disclosed herein contemplate providing secure access to various types of "private servers" (e.g., disposed behind a firewall within a private and trusted network), via the "untrusted" Internet, by multiple remote web-access client computing devices.

In one exemplary implementation, the Applicant has integrated FSS functionality and services with Backup Management and Storage (BMS) functionality and services in a single appliance deployed within a private and trusted LAN. For purposes of the present disclosure, such an appliance is referred to as a "file sharing and synchronization and backup management and storage" (FSSBMS) apparatus. An FSSBMS apparatus according to various implementations described in greater detail below provides a specific example of a "private server apparatus" (or simply "private server") that may be readily and securely accessed outside of the LAN via the Internet by multiple remote web-access client computing devices, according to the inventive concepts disclosed herein.

In various aspects, a local FSSBMS apparatus deployed in a trusted LAN provides BMS functionality for one or more other servers in the LAN based on full and incremental disk images of a given server's file system. Each LAN server to be backed-up implements a backup agent suitable for the server's operating system, wherein the backup agent provides to the FSSBMS apparatus full backup image files as well as incremental backup image files for the server's file system. The FSSBMS apparatus processes a given full backup image file and its associated incremental backup image files to generate a set of fully constructed backup recovery points for the LAN server. In some implementations, respective logical blocks of the backup image files are stored in memory of the FSSBMS apparatus as a logical volume formatted as a Virtual Machine Disk (VMDK) container, and the FSSBMS apparatus takes versioned copy-on-write (COW) snapshots of the logical volume as a function of time so as to generate the set of fully constructed backup recovery points.

In other aspects of the BMS functionality provided by the FSSBMS apparatus, a copy of the logical volume containing the respective logical blocks of the backup image files, as well as at least some of the backup recovery points, may be transmitted by the FSSBMS apparatus to a trusted proprietary backup storage domain (e.g., the trusted backup storage domain 500 shown in FIG. 1) for redundant hybrid cloud storage (i.e., local backup/restore resources that are replicated, at least in part, in a trusted cloud domain). In yet another aspect of the BMS functionality, the FSSBMS apparatus may implement a hypervisor to allow the operating system of the backed-up LAN server to run as a guest operating system on the FSSBMS apparatus; in this manner, the hypervisor may use any one of the fully constructed backup recovery points to readily implement the backed-up LAN server as a virtual machine on the FSSBMS apparatus.

Regarding the FSS functionality and services provided by various examples of a local FSSBMS apparatus according to the present disclosure, in one aspect an administrator for the FSSBMS apparatus (e.g., an MSP or local IT service provider in the LAN) may access the FSSBMS apparatus via a graphical user interface (GUI) (e.g., provided by the FSSBMS apparatus via a LAN client terminal), to easily install, configure and enable FSS functionality and services for authorized users inside or outside of the LAN. In one example, upon enabling FSS functionality and services, an FSS data package is downloaded to the FSSBMS apparatus (e.g., from the trusted backup storage domain 500 shown in FIG. 1), and the FSSBMS apparatus automatically extracts from the package, installs, and configures an FSS server application, an FSS file system and an FSS database. In some implementations, previously identified authorized users for BMS functionality are automatically designated as authorized users of FSS functionality and services as well. Thereafter, authorized FSS users, via client computing devices with installed FSS client applications, may upload one or more files to the FSS file system, and edit files, share files, and synchronize one or more files between the FSS file system and one or more client computing devices.

In other aspects, secure remote access to the FSS functionality and services provided by an FSSBMS apparatus in a trusted LAN is enabled, without changing firewall rules/network configuration, via a relay server cluster; the relay server cluster is thusly named for "relaying" traffic between one or more remote web-access client devices (with installed FSS client applications) and one or more local FSSBMS apparatuses behind the firewalls of respective LANs. In some implementations, the relay server cluster is operated and maintained within the trusted backup storage domain 500 shown in FIG. 1.

In one example, a relay server cluster comprises multiple physical server computing devices that implement multiple Device Access Services (DAS) servers and multiple name servers so as to provide redundant resources for supporting uninterrupted communications between remote client computing devices and FSSBMS apparatuses in trusted LANs. In various aspects, a given FSSBMS apparatus in a trusted LAN instantiates a reverse Secure Shell (SSH) tunnel with one of the DAS servers of the relay server cluster, and provides its Media Access Control (MAC) address to the DAS server. The MAC address for the FSSBMS apparatus is employed as part of a domain name alias, which is stored as part of a Canonical Name (CNAME) record in the Domain Name Service (DNS) records of the name servers of the relay server cluster; these CNAME records point the domain name alias for the FSSBMS apparatus to the canonical domain name for the DAS server to which the FSSBMS apparatus is connected via the reverse SSH tunnel.

Once a reverse SSH tunnel is established between an FSSBMS apparatus and one DAS server of the relay server cluster, and the DNS records of both name servers of the cluster include a CNAME record for the domain name alias of the FSSBMS apparatus, an authorized remote user may then enter the domain name alias for the FSSBMS apparatus in a browser of a remote web-enabled client device, using Hypertext Transfer Protocol over Secure Socket Layer (HTTPS), to ultimately communicate with the FSSBMS apparatus via the one DAS server and the reverse SSH tunnel; the name servers of the relay server cluster ensure that traffic is directed accordingly from the remote web-enabled client device via the DAS server and tunnel to the FSSBMS apparatus based on the CNAME record that points the domain name alias to the canonical domain name of the DAS server of the relay server cluster.

In yet another aspect of the inventive concepts disclosed herein, by integrating BMS and FSS functionality together in a single appliance, BMS functionality may be employed to backup FSS data. For example, in one implementation, the FSSBMS apparatus is configured to store in its memory the FSS file system as a logical volume formatted as a Virtual Machine Disk (VMDK) container. Periodic exports of the FSS database also may be stored in this logical volume. The FSSBMS apparatus may then take versioned copy-on-write (COW) snapshots of this logical volume as a function of time so as to generate a set of backup recovery points for the FSS server application, and the logical volume and at least some of the backup recovery points may be transmitted to a trusted proprietary backup storage domain (e.g., the trusted backup storage domain 500 shown in FIG. 1) for redundant hybrid cloud storage of FSS-related data.

In sum, some inventive implementations are directed to a relay server cluster, and corresponding methods, to facilitate communication, via the Internet, from at least one remote web-access client device to a first private server in, and behind a first firewall of, a first trusted local area network (LAN). The relay server cluster comprises: a first Device Access Services (DAS) server to establish and maintain a first secure communication link to the first private server behind the first firewall of the first trusted LAN to allow first inbound data traffic to flow from the at least one remote web-access client device to the first private server; a second Device Access Services (DAS) server to establish and maintain a second secure communication link to the first private server behind the first firewall of the first trusted LAN to allow the first inbound data traffic to flow from the at least one remote web-access client device to the first private server; a first Domain Name System (DNS) name server to store and update at least one first DNS record indicating one of the first DAS server and the second DAS server that has established and is maintaining a corresponding one of the first secure communication link and the second communication link to the first private server; and a second Domain Name System (DNS) name server to store and update at least one second DNS record indicating the one of the first DAS server and the second DAS server that has established and is maintaining the corresponding one of the first secure communication link and the second communication link to the first private server.

Other inventive implementations are directed to a private server apparatus for a trusted local area network (LAN), wherein the trusted LAN includes a LAN router constituting a firewall for the trusted LAN. The private server apparatus, and corresponding methods, are configured to establish and maintain at least one secure communication link to a relay server cluster outside of the trusted LAN and beyond the firewall so as to allow first inbound data traffic to flow, via the Internet and the relay server cluster, from at least one remote web-access client device outside of the LAN and beyond the firewall to the private server apparatus behind the firewall. The private server apparatus comprises: at least one communication interface; at least one memory to store processor-executable instructions; and at least one processor, communicatively coupled to the at least one communication interface and the at least one memory. Upon execution of at least some of the processor-executable instructions by the at least one processor, the at least one processor: A) controls the at least one communication interface to request and retrieve, via the Internet and using a first designated Uniform Resource Locator (URL), a first Domain Name System (DNS) text record, wherein the first DNS text record comprises: a first Device Access Services (DAS) server domain name for a first DAS server of the relay server cluster; and a second DAS server domain name for a second DAS server of the relay server cluster; B) selects one of the first DAS server domain name and the second DAS server domain name retrieved in A); C) controls the at least one communication interface to transmit a first request, via the Internet and using the one of the first DAS server domain name and the second DAS server domain name selected in B), to a corresponding one of the first DAS server and the second DAS server in the relay server cluster, for at least an external port number of the corresponding one of the first DAS server and the second DAS server used by the corresponding one of the first DAS server and the second DAS server to communicate with the private server apparatus via the Internet; D) controls the at least one communication interface to receive from the relay server cluster, via the Internet, the external port number of the corresponding one of the first DAS server and the second DAS server; and E) controls the at least one communication interface to transmit a second request, via the Internet and to the corresponding one of the first DAS server and the second DAS server, to open a first reverse Secure Shell (SSH) tunnel between the private server apparatus and the corresponding one of the first DAS server and the second DAS server, wherein the second request includes the external port number of the corresponding one of the first DAS server and the second DAS server, and wherein the first reverse SSH tunnel serves as the at least one secure communication link between the private server apparatus and the relay server cluster to allow the first inbound data traffic to flow from the at least one remote web-access client device to the private server apparatus.

Other inventive implementations are directed to an apparatus, and corresponding methods, for providing file synchronization and sharing (FSS) and backup management and storage (BMS) in a trusted local area network (LAN) including a plurality of first LAN computing devices. The apparatus comprises: at least one communication interface; at least one memory to store processor-executable instructions; and at least one processor, communicatively coupled to the at least one communication interface and the at least one memory, wherein upon execution of at least some of the processor-executable instructions by the at least one processor, the at least one processor: A) implements the BMS by: A1) controlling the at least one communication interface to receive, from a first LAN server of the plurality of computing devices in the LAN, a first LAN server full backup image file of a first LAN server file system and at least one first LAN server incremental backup image file of the first LAN server file system; and A2) processing the first LAN server full backup image file and the at least one first LAN server incremental backup image file so as to generate a first set of fully constructed backup recovery points for the first LAN server; and B) implements the FSS by: B1) controlling the at least one communication interface to transmit first user interface data representing an installation selection option to install an FSS server application on the apparatus; B2) controlling the at least one communication interface to receive second user interface data representing a selection of the installation selection option; and B3) in response to B2), controlling the at least one communication interface to request and receive, via the Internet, the FSS server application, and controlling the at least one memory to install the FSS server application on the apparatus.

Other inventive implementations are directed to an apparatus, and corresponding methods, for providing file synchronization and sharing (FSS), and file system backup management and storage (BMS), in a first trusted local area network (LAN), wherein the first trusted LAN includes: a first LAN router constituting a first firewall for the first trusted LAN; a first LAN server behind the first firewall, the first LAN server having a first LAN server operating system and a first LAN server file system and executing a first LAN server backup agent to generate a first LAN server full backup image file of the first LAN server file system at a first time and at least one first LAN server incremental backup image file of the first LAN server file system at a second time after the first time, wherein the first LAN server full backup image file includes a plurality of first logical blocks corresponding to the first LAN server file system at the first time, the plurality of first logical blocks including a block A, and wherein the at least one first LAN server incremental backup image file includes a changed block A' representing at least one change in data contents of the block A between the first time and the second time; a first LAN client computing device behind the first firewall, the first LAN client computing device storing a plurality of first LAN client files and executing a first FSS client application; and the apparatus behind the firewall and communicatively coupled to the first LAN server, the first LAN client computing device, and the first LAN router. The apparatus comprises: at least one communication interface to facilitate communication in the first trusted LAN with the first LAN server and the first LAN client computing device, and to facilitate communication between the Internet and the apparatus via the first LAN router; at least one memory to store processor-executable instructions comprising an apparatus operating system that implements an apparatus file system for the apparatus to store, in the at least one memory, a BMS application, an FSS server application, and an FSS file system used by the FSS server application and including a plurality of shared files including a first shared file; and at least one processor, communicatively coupled to the at least one communication interface and the at least one memory, wherein upon execution of at least some of the processor-executable instructions by the at least one processor, the at least one processor: A) implements the BMS application by: A1) controlling the at least one communication interface to receive, from the first LAN server, the first LAN server full backup image file of the first LAN server file system including the plurality of first logical blocks, and the at least one first LAN server incremental backup image file of the first LAN server file system including the changed block A'; and A2) processing the first LAN server full backup image file and the at least one first LAN server incremental backup image file so as to generate a first set of fully constructed backup recovery points for the first LAN server; and B) implements the FSS server application by: B1) controlling the at least one communication interface to exchange first communications with the first FSS client application executing on the first LAN client device so as to share the first shared file stored in the memory with the first LAN client device as a corresponding client file of the plurality of first LAN client files stored on the first LAN client device; and B2) controlling the at least one communication interface to exchange second communications with the first FSS client application executing on the first LAN client device so as to synchronize the first shared file stored in the memory with the corresponding client file of the plurality of first LAN client files.

Thus, the Applicant has contemplated a number of inventive concepts that constitute significant improvements in computer-related technology and address problems and challenges specifically arising in the realm of the Internet (i.e., "Internet-centric problems"), including inventive solutions that are inextricably tied to, and necessarily rooted in, computer technology.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following below are more detailed descriptions of various concepts related to, and embodiments of, inventive hybrid cloud methods, apparatus and systems for secure file sharing and synchronization integrated with image-based backup and server virtualization. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Overview

Figure 1:
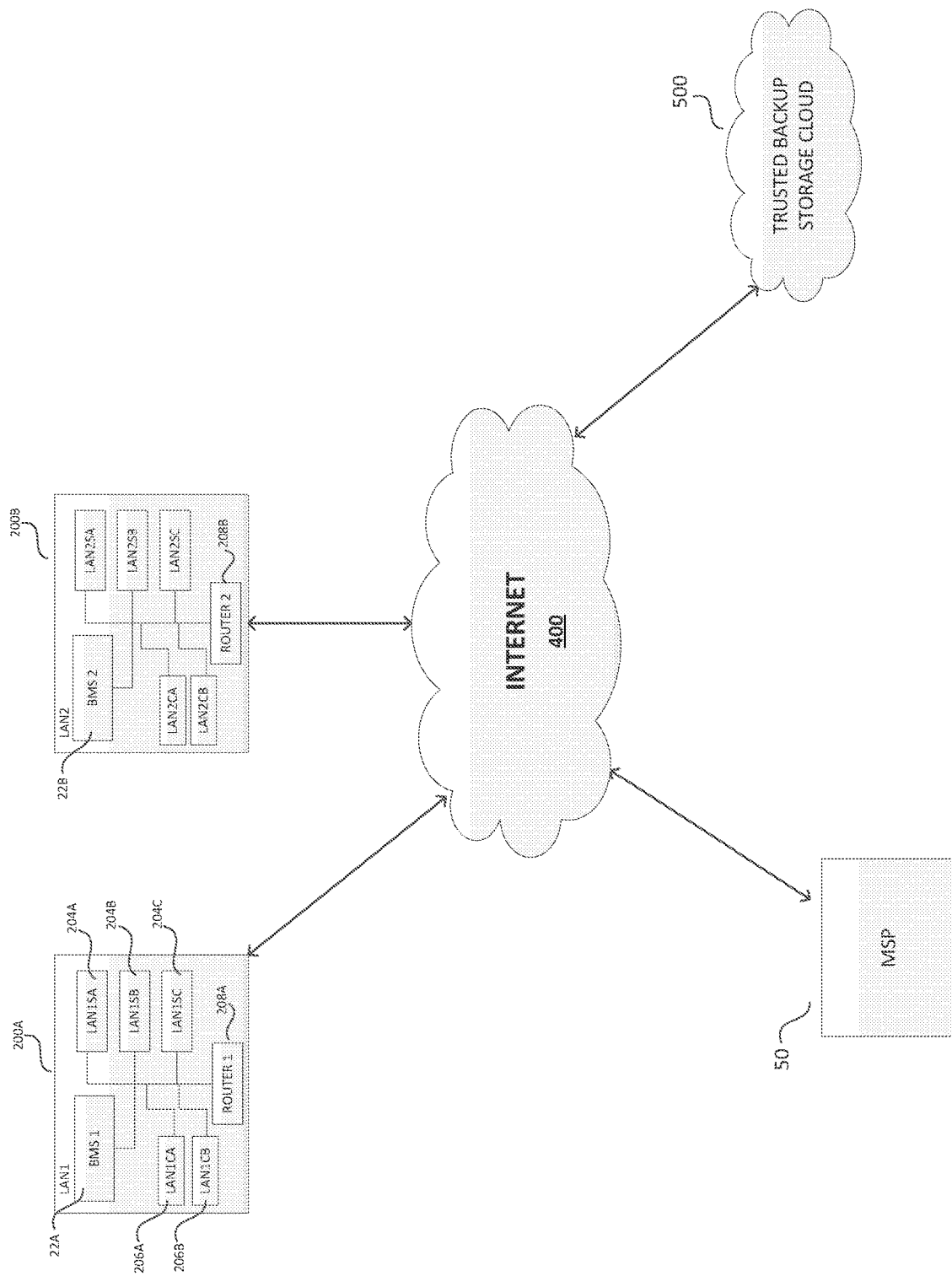
FIG. 1 illustrates an example commercial implementation of a Managed Service Provider (MSP) providing IT services to Small-to-Medium-sized Business (SMB) end-users that maintain (e.g., own/operate) one or more Local Area Networks (LANs) to support their electronic business information and communication needs, wherein respective LANs include a Backup Management and Storage (BMS) apparatus, according to the inventive concepts discussed herein.
Figure 2:
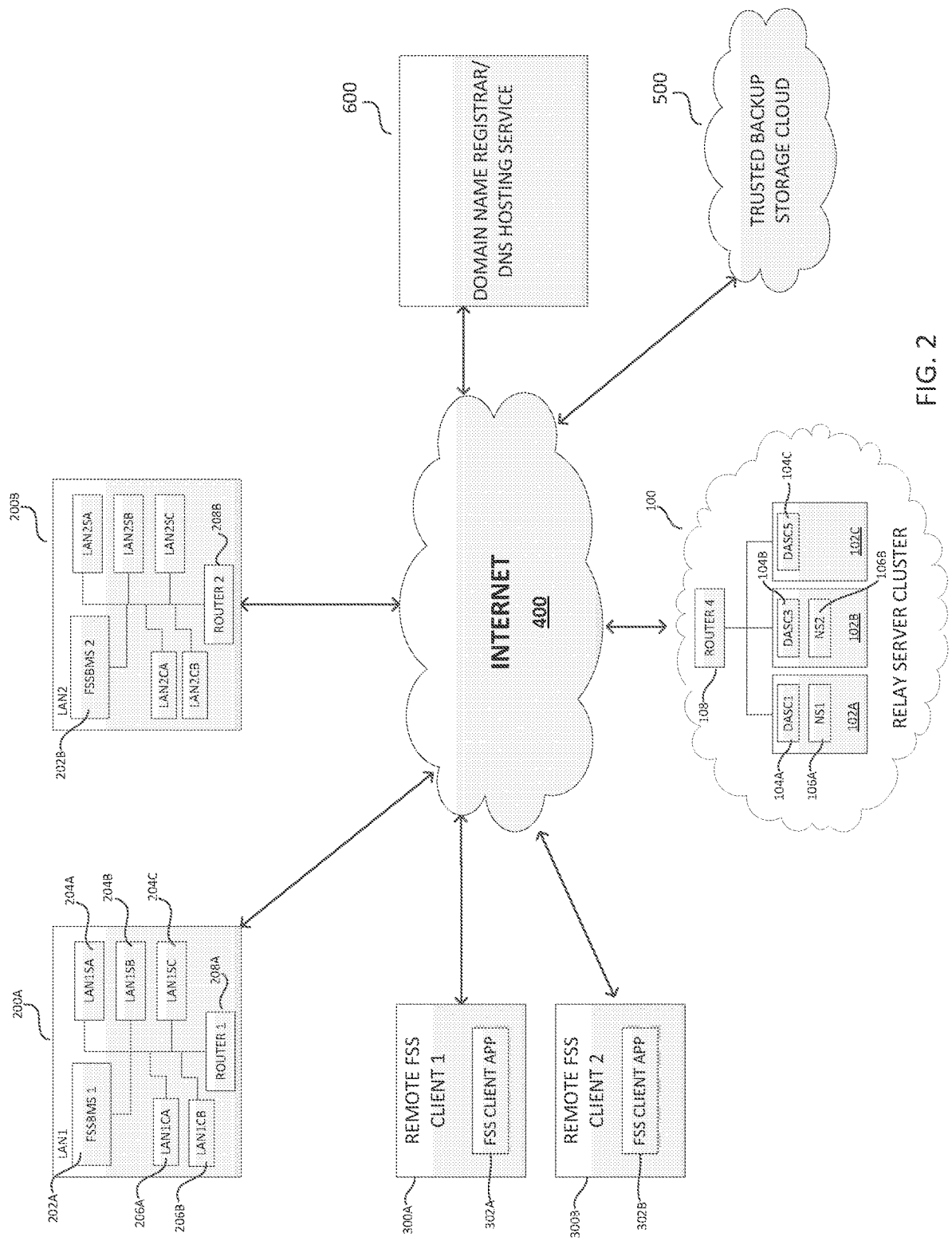
FIG. 2 illustrates multiple entities communicatively coupled via the Internet, including a domain name registrar/DNS hosting service, a trusted backup storage domain, multiple remote web-access client devices, a relay server cluster, and multiple LANs each including a file sharing and synchronization and backup management and storage (FSSBMS) apparatus, according to the inventive concepts discussed herein.

FIG. 2 illustrates multiple entities communicatively coupled via the Internet 400, including a domain name registrar/DNS hosting service boo, a trusted backup storage domain 500, multiple remote web-access client computing devices 300A and 300B, a relay server cluster 100, and multiple trusted (private) LANs 200A and 200B each including a file sharing and synchronization and backup management and storage (FSSBMS) apparatus (202A and 202B, respectively), according to inventive concepts discussed herein. While two LANs 200A and 200B and two remote client devices 300A and 300B are shown in FIG. 2 for purposes of illustration, it should be appreciated that additional LANs and additional remote client devices are contemplated in connection with the inventive concepts disclosed herein in various implementations. For purposes of the present discussion, pertinent details of one of the LANs 200A, and one of the remote client computing devices 300A, will be discussed herein as representative of other LANs and other remote client computing devices that may be present in various implementations. Similarly, pertinent details of one of the FSSBMS apparatuses 202A will be discussed herein as representative of other FSSBMS apparatuses that may be present in various implementations.

As shown in FIG. 2, in addition to a first FSSBMS apparatus 202A, the first trusted LAN 202A includes one or more LAN servers (LAN1SA, 204A; LAN1SB, 204B; LAN1SC, 204C) to provide various functional services to one or more client computing devices in the LAN (LAN1CA, 206A; LAN1CB, 206B). As noted above, examples of common types of LAN servers include, but are not limited to, email servers, network servers (to manage network traffic), application servers, FTP servers, file servers, fax servers, and print servers. The LAN 200A also includes one or more routers 208A to couple the LAN 200A to the Internet 400. In one aspect, the router(s) 208A may serve as a type of "firewall" that prevents unintended incoming traffic from reaching the servers and client computing devices inside the trusted. LAN 200A. In another aspect, a firewall for the LAN 200A may be implemented by a dedicated hardware appliance working in tandem with the router(s) 208A, and/or as software executing on the router or other appliance. For purposes of the present disclosure and for the sake of illustrative simplicity, the router(s) 208A may be considered as an example of a firewall for the LAN 200A to establish a barrier between the trusted LAN 200A and the "entrusted" Internet 400.

In the trusted LAN 200A, the local FSSBMS apparatus 202A may provide, in a single network appliance, both File Sharing and Synchronization (FSS) functionality integrated with Backup Management and Storage (BMS) functionality for the servers and other computing devices in the trusted LAN 200A.

Regarding the BMS functionality, the FSSBMS apparatus 202A is configured (e.g., programmed via processor-executable instructions) to generate and store a set of fully constructed backup recovery points for any one or more of the LAN servers (e.g., LAN1SA, 204A; LAN1SB, 204B; LAN1SC, 204C) based on full and incremental disk images of a given LAN server's file system. As would be appreciated by those of skill in the art, a disk image is a computer file containing the contents and structure (i.e., file system) of a disk volume or an entire data storage device. A disk image usually is made by creating a sector-by-sector (or block-by-block) copy of the source storage medium, thereby perfectly replicating the contents and structure of the storage medium (for any of a variety of different types of file systems employed to store data on the source storage medium). As the names suggest, a full disk image is a complete block-by-block image of an entire source storage medium at a given point in time, whereas an incremental disk image includes only those blocks whose data contents have changed since an immediately prior full disk image or incremental disk image was taken.

To generate such image files, each LAN server to be backed-up implements a backup agent suitable for the server's operating system (a backup agent is a software "bot" that is capable of acting with a certain degree of autonomy to accomplish particular backup tasks on behalf of its host operating system). The backup agent provides to the FSSBMS apparatus full backup image files as well as incremental backup image files for the file system of the LAN server on which the backup agent is installed. The FSSBMS apparatus then processes a given full backup image file and its associated incremental backup image files to generate the set of fully constructed backup recovery points for the LAN server, and locally stores the image files and set of backup recovery points. The FSSBMS apparatus may store such image files and corresponding set of backup recovery points for multiple LAN servers in the trusted LAN 200A.

In other aspects of the BMS functionality provided by the FSSBMS apparatus 202A, a copy of the backup image files for a given LAN server, as well as at least some of the backup recovery points associated with the image files for a given LAN server, may be transmitted by the FSSBMS apparatus (via the Internet 400) to the trusted backup storage domain 500 shown in FIG. 2 for redundant hybrid cloud storage of server backup data. In yet another aspect of the BMS functionality, the FSSBMS apparatus 202A may implement a hypervisor (not shown in FIG. 2, but discussed further below in connection with FIG. 3) to allow the operating system of the backed-up LAN server to run as a guest operating system on the FSSBMS apparatus; in this manner, the hypervisor may use any one of the fully constructed backup recovery points (either stored locally in the FSSBMS apparatus, or retrieved from the trusted backup storage domain 500) to readily implement the backed-up LAN server as a virtual machine on the FSSBMS apparatus.

Regarding the FSS functionality and services provided by the FSSBMS apparatus 202A shown in FIG. 2, in one aspect an administrator for the FSSBMS apparatus (e.g., an MSP or local IT service provider in the LAN) may access the FSSBMS apparatus via a graphical user interface (GUI) (e.g., provided by the FSSBMS apparatus via one of the LAN client computing devices 206A or 206B), to easily install, configure and enable FSS functionality and services for authorized users inside or outside of the trusted LAN 200A. In one example, upon enabling FSS functionality and services, an FSS data package is requested and retrieved by the FSSBMS apparatus 202A from the trusted backup storage domain 500 shown in FIG. 2. The FSSBMS apparatus then automatically extracts from the package, and installs and configures in memory of the FSSBMS apparatus, an FSS server application, an FSS file system and an FSS database (not shown in FIG. 2, but discussed in greater detail below in connection with FIG. 3). Thereafter, authorized FSS users in the LAN, using the LAN client computing devices 206A and 206B (with installed respective FSS client applications) may upload one or more files to the FSS file system on the FSSBMS apparatus 202A, and edit files, share files, and synchronize one or more files between the FSS file system and one or more other LAN client computing devices.

In other aspects of the FSS functionality and services provided by the FSSBMS apparatus 202A shown in FIG. 2, secure remote access to the FSS server application and file system in the trusted LAN 200A (once installed and configured on the FSSBMS apparatus 202A) is enabled, without changing firewall rules/network configuration for the trusted LAN 200A, via a relay server cluster 100. More specifically, the relay server cluster "relays" FSS data traffic between one or more of the remote web-access client devices 300A and 300B (with installed respective FSS client applications 302A and 302B) and the FSSBMS apparatus 202A in the trusted LAN 200A (the relay server cluster 100 may similarly relay FSS data traffic between one or more of the remote web-access client devices and another FSSBMS apparatus behind the firewall of another trusted LAN, such as the LAN 200B). In some implementations, while not shown explicitly in FIG. 2, the relay server cluster 100 may be operated and maintained within the trusted backup storage domain 500 shown in FIG. 2.

As shown in FIG. 2, in one example the relay server cluster 100 comprises one or more routers 108 to couple the cluster to the Internet 400, as well as multiple physical server computing devices 102A, 102B, and 102C that implement multiple Device Access Services (DAS) servers (DASC1, 104A; DASC3, 104B; DASC5, 104C) and multiple name servers (NS1, 106A; NS2, 106B). The multiple physical server computing devices implementing multiple DAS servers and multiple name servers provide redundant relay resources for supporting substantially uninterrupted communications between the remote client computing devices 300A and 300B and respective FSSBMS apparatuses 202A and 200B in trusted LANs 200A and 200B. While three physical server computing devices implementing three DAS servers and two name servers are shown in FIG. 2 for purposes illustrating an example of the relay server cluster 100, it should be appreciated that different numbers of physical servers implementing different numbers of DAS servers and name servers are contemplated in connection with the inventive concepts disclosed herein in various implementations of the relay server cluster. In some implementations, although more than two DAS servers may be employed in the relay cluster, generally two name servers are sufficient to maintain reliable operation of the relay server cluster and provide requisite redundancy for robust operation. For purposes of the present discussion, pertinent details of one of the physical servers 102A, one of the DAS servers 104A, and one of the name servers 106A will be discussed herein as representative of other similar corresponding devices that may be present in various implementations of the relay server cluster 100.

In various aspects relating to providing secure access by the remote web-access client devices 300A and 300B to the FSS functionality and services provided by the FSSBMS apparatus 202A in the trusted LAN 200A, upon enabling remote FSS access the FSSBMS apparatus 202A first queries the domain name registrar/DNS hosting service 600 for the domain names of available DAS servers in the relay server cluster 100 (as some DAS servers in the cluster may be rotated in and out of the cluster from time to time for maintenance or repairs, or otherwise unavailable due to malfunction). The FSSBMS apparatus 202A then selects (e.g., randomly) one available DAS server in the cluster 100 based on the domain names returned by the DNS hosting service 600, and instantiates a reverse Secure Shell (SSH) tunnel (not shown in FIG. 2, but discussed further below in connection with FIG. 7), via the Internet 400, with the selected DAS servers. The FSSBMS apparatus 202A also provides its Media Access Control (MAC) address to the selected DAS server; this MAC address is employed as part of a domain name alias for the FSSBMS apparatus 202A, which is stored as part of a Canonical Name (CNAME) record in the Domain Name Service (DNS) records of the name servers 106A and 106B of the relay server cluster 100. These CNAME records point the domain name alias for the FSSBMS apparatus 202A to the canonical domain name for the selected DAS server to which the FSSBMS apparatus is connected via the reverse SSH tunnel.

Figure 7:
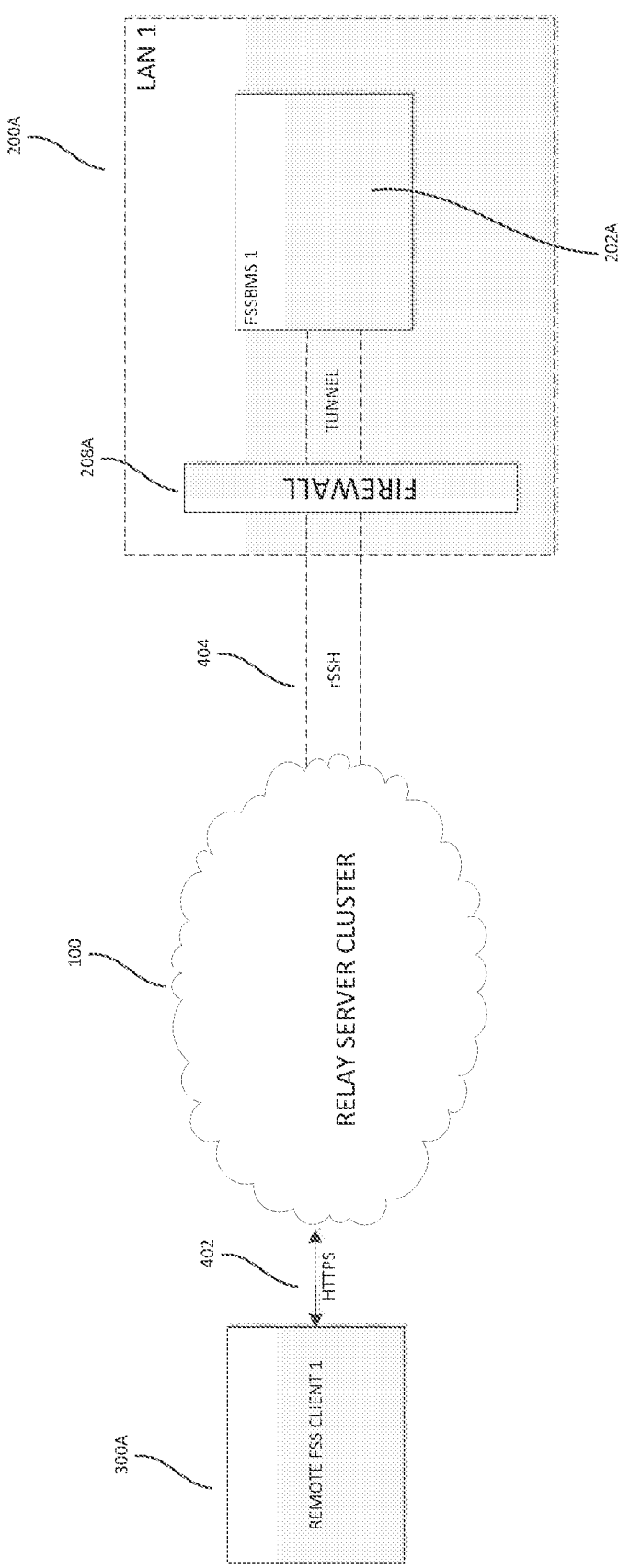
FIG. 7 schematically illustrates communicative coupling between one of the remote client computing devices shown in FIG. 2 and one of the FSSBMS apparatuses shown in FIG. 2, via the relay server cluster shown in FIG. 2, according to the inventive concepts discussed herein.

Once a reverse SSH tunnel is established between the FSSBMS apparatus 202A and the selected DAS server of the relay server cluster 100, and the DNS records of both name servers 106A and 106B of the cluster include a CNAME record for the domain name alias of the FSSBMS apparatus, an authorized remote user may then enter the domain name alias for the FSSBMS apparatus in a browser of either of the remote web-enabled client devices 300A and 300B, using Hypertext Transfer Protocol over Secure Socket Layer (HTTPS), to ultimately securely communicate with the FSSBMS apparatus 202A via the selected DAS server and the reverse SSH tunnel (discussed further below in connection with FIG. 7). In particular, the name servers 106A and 106B of the relay server cluster 100 ensure that data traffic is directed accordingly from the remote web-enabled client devices 300A and 300B, via the selected DAS server and the SSH tunnel, to the FSSBMS apparatus 202A, based on the CNAME record that points the domain name alias of the FSSBMS apparatus 202A to the canonical domain name of the selected DAS server of the relay server cluster 100.

In yet another aspect of the inventive concepts disclosed herein, by integrating BMS and FSS functionality together in the FSSBMS apparatus 202A, BMS functionality may be employed to backup FSS data. For example, the FSS file system and associate database may be imaged and processed to generate a set of backup recovery points for the FSS server application, and images/backup recovery points may be transmitted to the trusted backup storage domain 500 for redundant hybrid cloud storage of FSS-related data.

FSSBMS Apparatus

Figure 3:
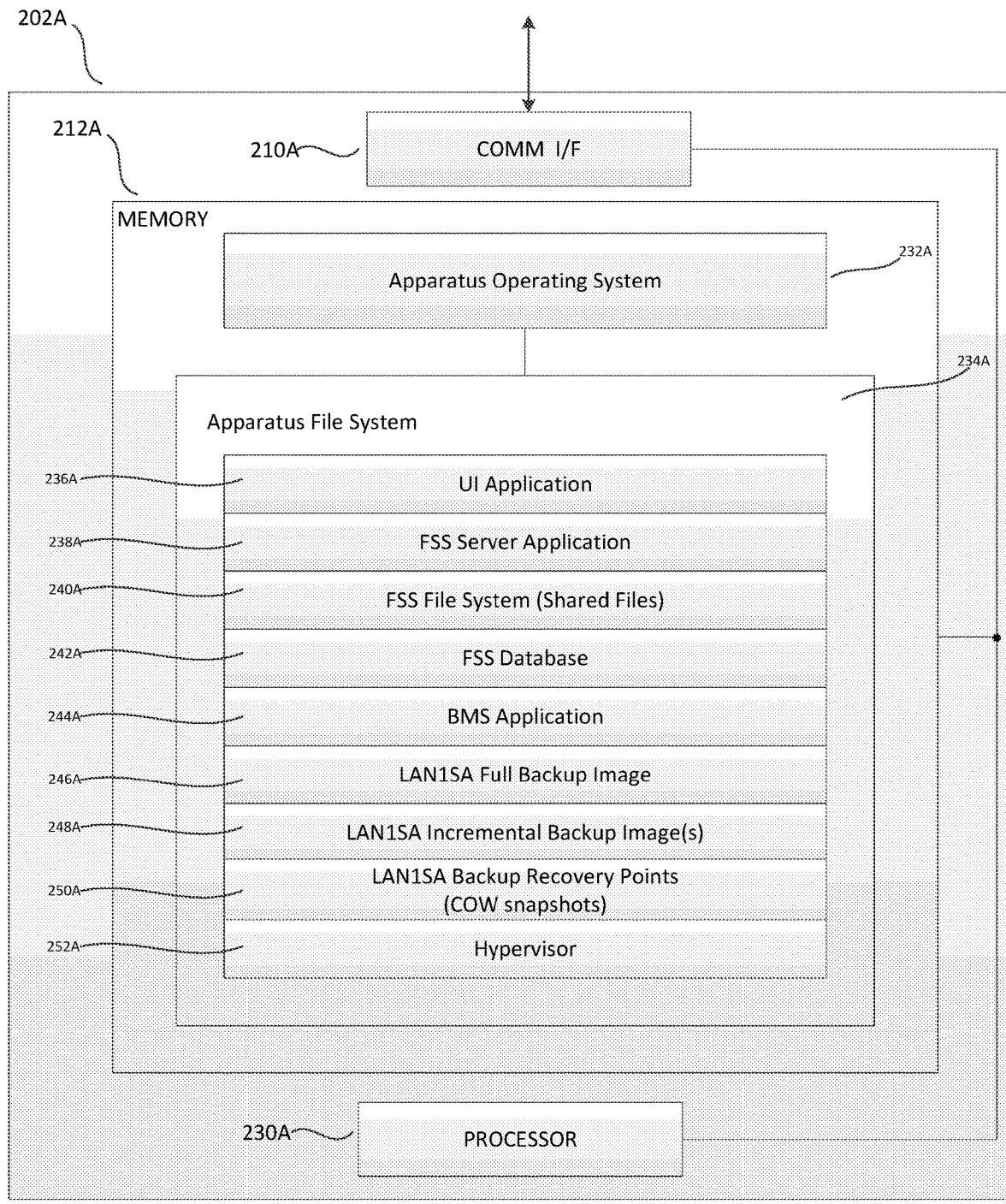
FIG. 3 illustrates various details of one of the FSSBMS apparatuses shown in FIG. 2, according to the inventive concepts discussed herein.

FIG. 3 illustrates various details of one of the FSSBMS apparatuses 202A shown in FIG. 2, according to the inventive concepts discussed herein. The FSSBMS apparatus 202A provides a specific example of a more general purpose "private server apparatus" (or simply "private server") according to the inventive concepts disclosed herein, wherein the private server is resident behind a firewall in a trusted LAN, and may be readily and securely accessed outside of the LAN via the Internet by multiple remote web-access client computing devices and without changing firewall rules. Various concepts relating to remote access to a private server behind a firewall of a trusted LAN are discussed in greater detail below, in connection with FIGS. 7 through 14. The FSSBMS apparatus 202A shown in FIG. 3 is a particular example of such a private server in that it is configured to provide the specific functionalities of FSS and BMS integrated in a single network appliance.

As illustrated in FIG. 3, the FSSBMS apparatus 202A comprises one or more communication interfaces 210A, a memory 212A, and one or more processors 230A communicatively coupled to the memory and the communication interface(s). As would be readily appreciated by those of skill in the relevant arts, a variety of hardware and software components relating to computer technologies and Internet communications may be employed to implement various instantiations of the FSSBMS apparatus 202A in a manner consistent with the inventive concepts disclosed herein. With reference again to FIG. 2, the communication interface(s) 210A of the FSSBMS apparatus 202A generally serve to facilitate communications with other computing devices in the LAN 200A in which the FSSBMS apparatus is deployed (e.g., the LAN servers 204A, 204B, and 204C; the LAN client computing devices 206A and 206B; the router 208A) and ultimately with the Internet 400 (e.g., via the LAN router 208A). The memory 212A may be architected and configured in a variety of manners (one example of which is discussed further below in connection with FIG. 4), and stores a variety of processor-executable instructions (e.g., in the form of "applications") for execution by the processor(s) 230A, as well as various data files associated with executable applications and other processor-executable instructions.

For example, as shown in FIG. 3, the memory 212A of the FSSBMS apparatus 202A stores an apparatus operating system 232A and an apparatus file system 234A, wherein the apparatus file system includes a number of executable applications and associated data files to implement various aspects of BMS functionality and FSS functionality. As would be readily appreciated by those of skill in the relevant arts, the apparatus file system 234A refers to the protocol and structure for storing data content in the memory 212A (e.g., the way data is organized), which the apparatus operating system 232A uses to keep track of stored data. In various implementations of the FSSBMS apparatus 202A, a variety of apparatus operating system and apparatus file system options may be employed in a manner consistent with the inventive concepts disclosed herein. For example, in one implementation, the apparatus operating system 232A is a Unix-like operating system (e.g., a Linux® operating system) and the apparatus file system 234A is a combined file system and logical volume manager, an example of which is provided by the Zettabyte File System (ZFS®).

With respect to the various executable applications and associated data files that may be stored in the memory 212A of the FSSBMS apparatus 202A, FIG. 3 illustrates that the apparatus file system 234A may include a user-interface and communication (UI) application 236A. The UI application 236A is executed by the processor(s) 230A to generally manage data communications to and from the FSSBMS apparatus 202A. In some aspects, such data communications may include the provision of data to instantiate one or more graphical user interfaces (GUIs) on other computing devices (e.g., the local LAN client computing devices 206A and 206B, and/or the remote client computing devices 300A and 300B) to allow IT personnel (e.g., authorized network administrators and/or appliance-specific administrators or other users) to configure the FSSBMS apparatus and monitor various functionality of the apparatus.

The apparatus file system 234A of the FSSBMS apparatus 202A shown in FIG. 3 also includes multiple executable applications and associated files relating to FSS functionality, for example an FSS server application 238A, an FSS file system 240A, and an FSS database 242A. As introduced above and discussed in greater detail below, it should be appreciated that the executable applications and associated files relating to FSS functionality may not necessarily be resident in the apparatus file system 234A at all times in some implementations, and instead may be downloaded, installed, configured, enabled, disabled and uninstalled (e.g., by an administrator/authorized user) at will for a variety of reasons and in a variety of circumstances. It should also be appreciated that the FSS file system 240A (e.g., which is used by the FSS server application 238A to organize and keep track of stored user files that may be shared and synchronized) need not necessarily be the same type of file system as the apparatus file system 234A itself; instead, as discussed further below in connection with FIG. 4, in some implementations the apparatus file system 234A organizes the memory 212A in terms of logical volumes, and a given logical volume itself may contain data that is organized according to any of a variety of different file systems.

With respect to BMS functionality, the apparatus file system 234A of the FSSBMS apparatus 202A shown in FIG. 3 also includes multiple executable applications and associated data files, for example a BMS application 244A, a first LAN server full backup image file 246A, one or more first LAN server incremental backup image files 248A, a set of first LAN server backup recovery points (e.g., copy-on-write or COW snapshots) 250A, and a hypervisor 252A. As introduced above and discussed in further detail below (e.g., in connection with FIGS. 5A and 6), the BMS application 244A is executed by the processor to generate and store one or more sets of fully constructed backup recovery points, for any one or more of the LAN servers in the LAN 200A (e.g., LAN1SA, 204A; LAN1SB, 204B; LAN1SC, 204C), based on full and incremental disk images of a given LAN server's file system. In the example illustration shown in FIG. 3, representative files of backup images (i.e., the files 246A and 248A) and backup recovery points (i.e., the file 250A) for only one such LAN server (i.e., the first LAN server 204A) are shown for simplicity; however, it should be appreciated that the apparatus file system 234A may store full and backup image files and associated backup recovery points for any one or more of the LAN servers at various points in time.

Finally, FIG. 3 also illustrates that the apparatus file system 234A of the FSSBMS apparatus 202A may include a hypervisor 252A in some implementations to facilitate server virtualization, based on stored image files of a LAN server's file system and one or more associated backup recovery points. As would be readily appreciated by those of skill in the relevant arts, a hypervisor (also referred to as a "virtual machine monitor") is an executable application, executed by a host computing device running a host operating system and having host hardware components, to instantiate on the host computing device a virtual computing device or "virtual machine" that runs a guest operating system that is different from the host operating system. In one aspect, the hypervisor manages the execution of the guest operating system (e.g., running as a "process" on the host computing device) so that it seamlessly interfaces with the host operating system and host hardware components to effectively instantiate the virtual machine (as if the guest operating system were running on its own dedicated physical computing device). In the example shown in FIG. 3, the FSSBMS apparatus 202A is the host computing device, the apparatus operating system 232A is the host operating system, and the communication interface(s) 210A, the memory 212A and the processor 230A represent the host hardware (and host software) components. Via the hypervisor 252A, any LAN server whose image files and associated backup recovery points have been saved in the apparatus file system 234A may be virtualized on the apparatus 202A.

For example, the first LAN server may be virtualized using the first LAN server image files 246A and 248A, which contain the first LAN server's operating system and file system. The hypervisor 252A may use any one of the backup recovery points in the file 250A to run the first LAN server operating system as a guest operating system on the apparatus 202A so as to implement the first LAN server as a virtual machine on the apparatus 202A. Furthermore, as discussed above in connection with the FSS file system 240A, it should be appreciated that the first LAN file system represented in the first LAN server image files need not necessarily be the same type of file system as the apparatus file system 234A itself; instead, as discussed further below in connection with FIG. 4, in some implementations the apparatus file system 234A organizes the memory 212A in terms of logical volumes, and a given logical volume itself may contain data (e.g., the full image file 246A and the incremental image file(s) 248A) that is organized according to any of a variety of different file systems.

Figure 4:
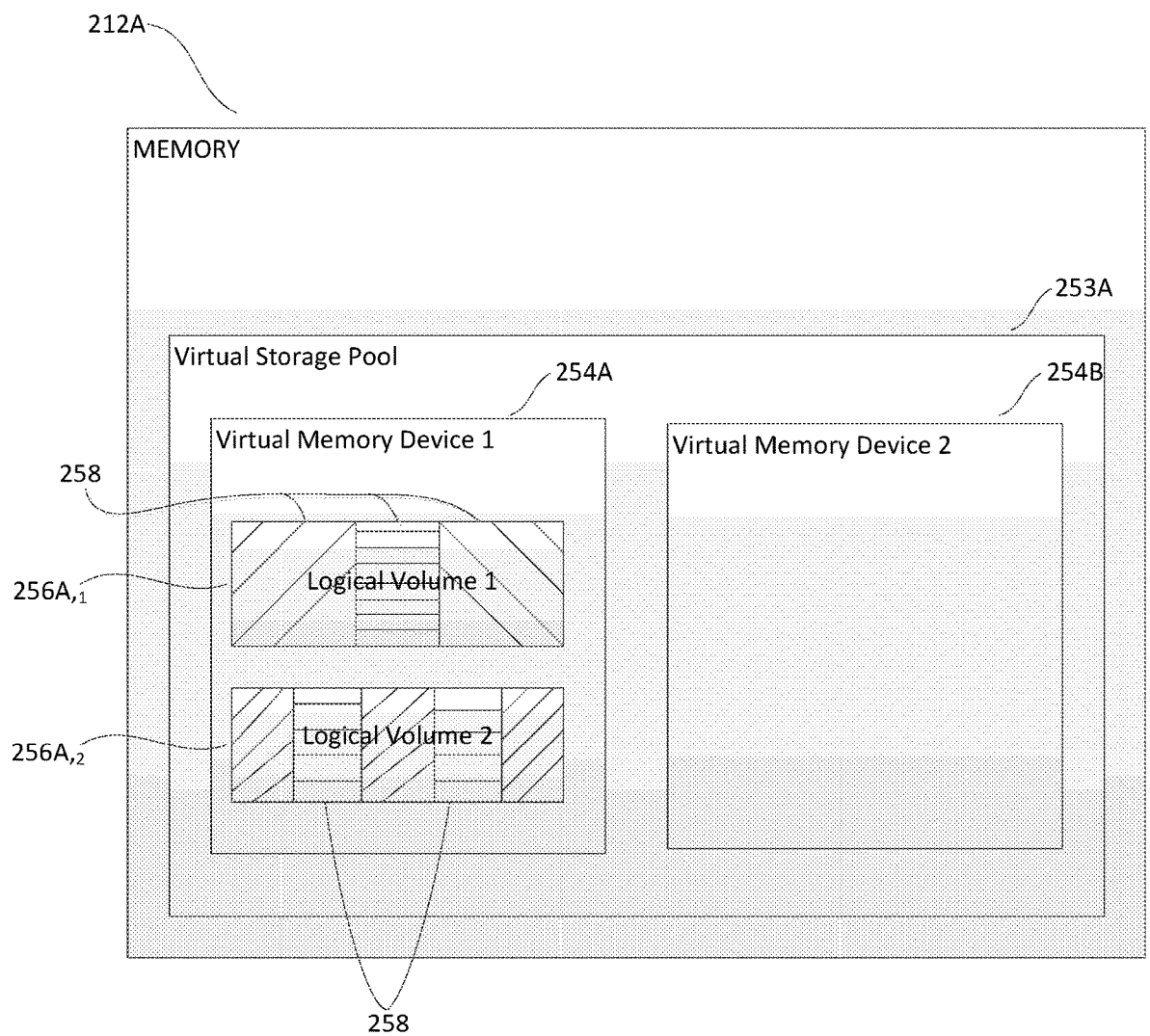
FIG. 4 illustrates an example of a memory configuration in the FSSBMS apparatus shown in FIG. 3, according to the inventive concepts discussed herein.

More specifically, FIG. 4 illustrates an example of a particular configuration of the memory 212A in the FSSBMS apparatus 202A shown in FIG. 3, in which various data may be stored as logical volumes according to the inventive concepts discussed herein. As shown in FIG. 4, in some implementations the memory 212A may be configured as a virtual storage pool 253A that includes one or more virtual memory devices (e.g., the virtual memory devices 254A and 254B). A given virtual memory device in the storage pool in turn may include a logical arrangement of multiple block storage devices; for example, FIG. 4 shows that the virtual memory device 254A is configured to include a first logical volume $256A_1$ and a second logical volume $256A_2$, in which each logical volume includes a logical arrangement of some number of block devices 258. As would be readily appreciated by those of skill in the relevant arts, a block storage device is a storage device that supports reading (and optionally writing) of data in blocks or sectors having a particular size (e.g., number of bytes).

In FIG. 4, for purposes of illustration, the first logical volume $256A_1$ is shown as being constituted by three block devices 258, whereas the second logical volume $256A_2$ is shown as being constituted by five block devices 258; in general, it should be appreciated that different logical volumes may be constituted by different numbers of block devices, block devices with a variety of different block sizes may be employed in any given logical volume, and a given logical volume may include a substantially larger number of block devices (and hence larger number of blocks) than those shown in FIG. 4. Additionally, while only two logical volumes are shown in FIG. 4 in the first virtual memory device 254A, and only two virtual memory devices are shown in the virtual storage pool 253A, it should be appreciated that in various implementations a given virtual memory device may include different (e.g., greater) numbers of logical volumes, and the virtual storage pool may include different (e.g., greater) numbers of virtual memory devices. As noted above, in some exemplary implementations, the apparatus file system employed for the memory 212A may be the Zettabyte File System (ZFS®) in which, in one example, data is stored in the virtual storage pool in logical blocks having a size of 128 kB. Additionally, as also noted above, in some exemplary implementations the FSS file system 240A shown in FIG. 3 (and in some instances exported data from the FSS database 242A) may be stored in a first logical volume of an apparatus file system similar to that shown in FIG. 4, and backup image files for a given LAN server (e.g., the full image file 246A and incremental image file(s) 248A) may be stored in a second logical volume (in the same virtual memory device or different virtual memory devices) of an apparatus file system similar to that shown in FIG. 4.

Figure 5A:
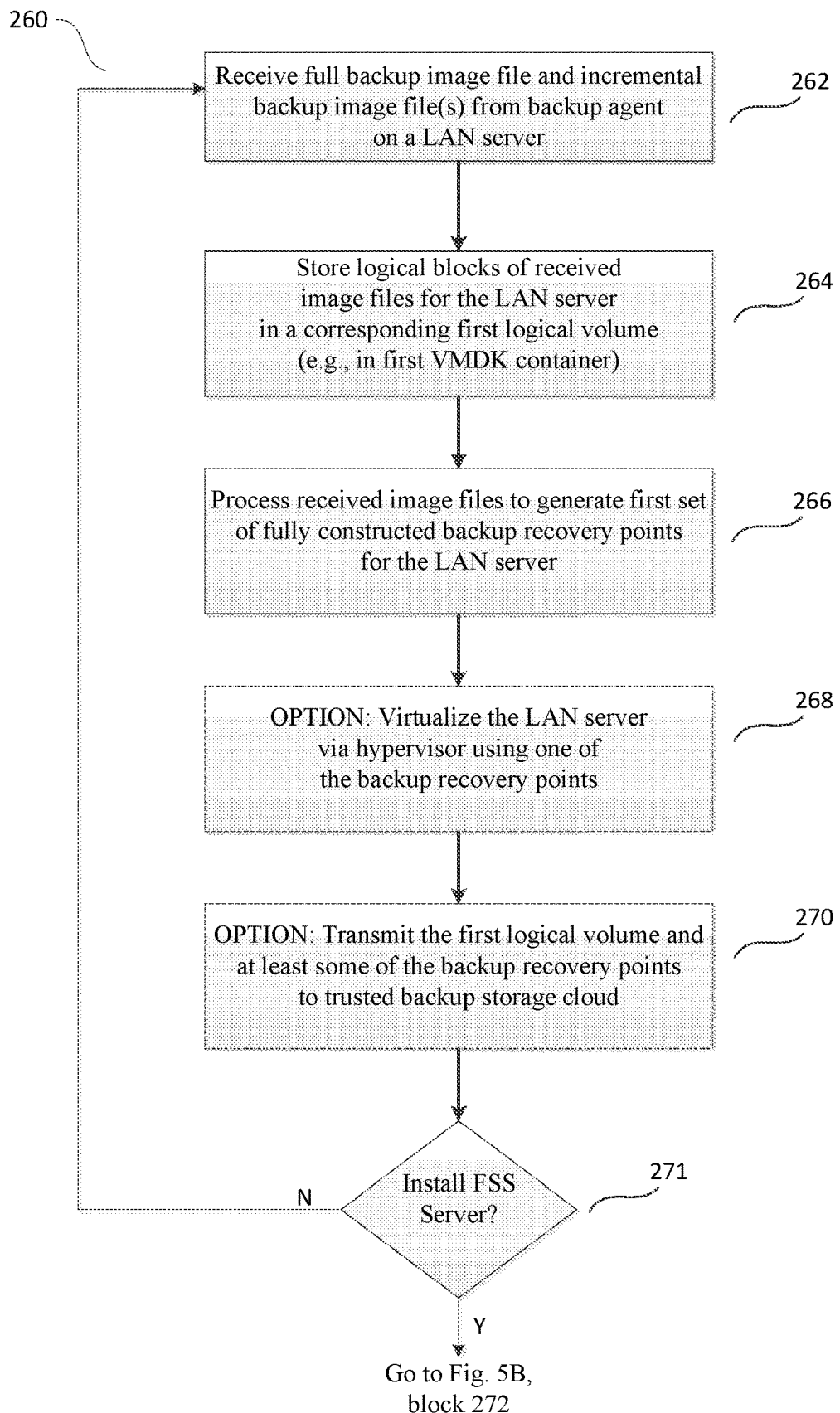
FIGS. 5A and 5B illustrate an example of a method for providing FSS and BMS functionality via the FSSBMS apparatus shown in FIG. 3, according to the inventive concepts discussed herein.
Figure 5B:
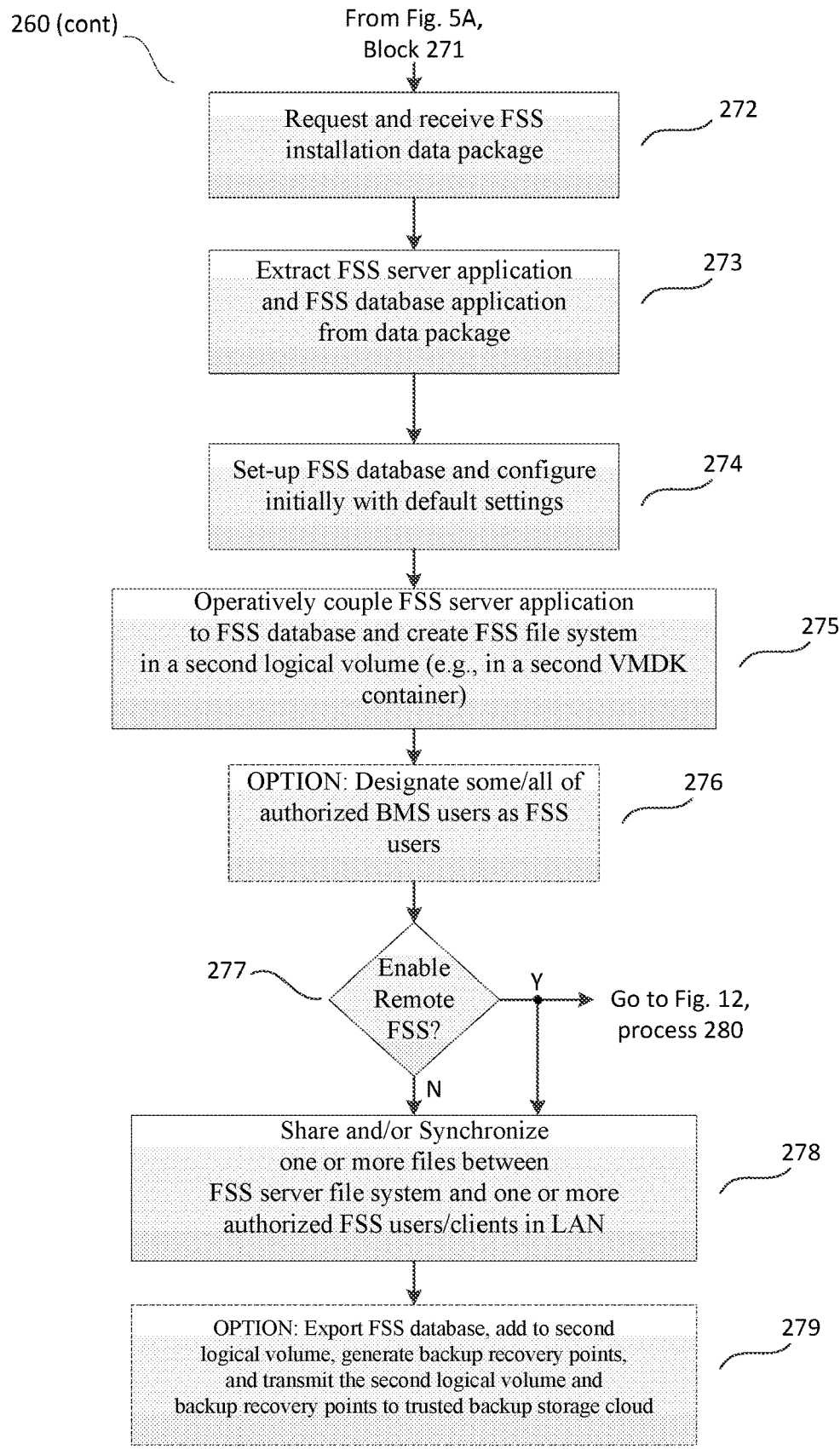

FIGS. 5A and 5B illustrate an example of a method 260 for providing FSS and BMS functionality via the FSSBMS apparatus 202A shown in FIG. 3, according to the inventive concepts discussed herein. In various implementations, some of the blocks shown in the method 260 are performed at least in part by the processor 230A of the apparatus 202A via execution of the BMS application 244A (e.g., in conjunction with the apparatus operating system 232A) and operation of the memory 212A and the communication interface(s) 210A, whereas some of the blocks shown in the method 260 are performed by the processor 230A via execution of the FSS application 238A (e.g., in conjunction with the operating system 232A, and based on data in the FSS database 242A) and operation of the memory 212A and the communication interface(s) 210A.

In block 262 of FIG. 5A, a full backup image file and one or more incremental backup image files are received from a backup agent executing on a first LAN server in the trusted LAN 200A. As discussed above, these image files (or "disk images") are block-by-block copies of the contents and structure (i.e., file system) of the first LAN server; a full image file is a complete block-by-block image of the entire server file system, whereas the incremental image file includes only those blocks whose data contents have changed since an immediately prior full image or incremental image was taken by the backup agent on the first LAN server. In block 264, the respective logical blocks of the received image files for the first LAN server are stored in a corresponding first logical volume in memory. In some implementations, the first logical volume may be formatted as a Virtual Machine Disk (VMDK) container; as would be readily appreciated by those of skill in the relevant arts, VMDK is a conventional file format that describes containers for virtual hard disk drives to be used in virtual machines. In block 266, the image files stored in the first logical volume are processed to generate a first set of fully constructed backup recovery points for the first LAN server. Additional details regarding the processing of the blocks stored in the first logical volume to generate fully constructed backup recovery points are discussed further below in connection with FIG. 6.

In block 268 of the method 260 shown in FIG. 5A, the first LAN server optionally may be virtualized (i.e., run as a virtual machine on the FSSBMS apparatus 202A), as described above in connection with FIG. 3, via the hypervisor 252A using one of the backup recovery points generated in block 266. Additionally, as shown in block 270, the first logical volume including the blocks of image files stored in block 264, as well as at least some of the backup recovery points generated in block 266, optionally may be transmitted to the trusted backup storage domain 500 shown in FIG. 2, to provide for redundant (or alternative) backup storage of the first LAN server's file system and recovery points as a function of time.

In block 271 of the method 260, an authorized user/administrator for the FSSBMS apparatus 202A is given an option to install FSS server functionality on the FSSBMS apparatus. Although block 271 is illustrated in FIG. 5A as following block 270, it should be appreciated that the respective blocks of the method 260 may be arranged in different orders in some implementations, and that the option to install FSS server functionality may be presented following initial booting of the apparatus (and before any image-based backup activity has occurred, i.e., blocks 262-270). In any event, if an authorized user/administrator does not wish to install FSS server functionality, the method 260 returns to block 262, at which point a new set of image files may be processed for the first LAN server, and/or one or more sets of image files for other LAN servers in the trusted LAN 200A may be processed in a manner similar to that shown in blocks 262 through 270 of FIG. 5A. If installation of FSS server functionality is desired, the method 260 proceeds to FIG. 5B and block 272. It should be appreciated however that in alternative implementations, FSS server functionality may be "pre-installed" and that at least some of the blocks shown in FIG. 5B may not be required in such alternative implementations.

Turning now to FIG. 5B, in block 272 an FSS installation package is requested and received, for example, from the trusted backup storage domain 500 shown in FIG. 2. In various aspects, the FSS installation package is particularly constructed to facilitate ease of installation and configuration of FSS functionality and services on the FSSBMS apparatus, requiring only nominal interaction or input (e.g., a small number of clicks or selections via a GUI) from the authorized user/administrator. To this end, one example of an installation package includes the FSS server application and an FSS database application, and additional executable installation instructions for preliminary configuration of the FSS database and implementation of the FSS file system. As indicated in block 273, the FSS server application and FSS database application may be automatically extracted from the installation package, along with any accompanying executable installation instructions, and in block 274 the FSS database may be setup and configured, pursuant to the executable installation instructions, with default settings to facilitate access by the FSS server application. In block 275, the FSS server application is operatively coupled to the FSS database, and the FSS file system is created in a second logical volume of the memory (e.g., in a second VMDK container). In block 276, if there have been previously designated authorized users of the BMS functionality associated with the FSSBMS apparatus (e.g., as configured by an administrator for the apparatus), some or all of these authorized users optionally may be automatically designated as authorized users of FSS functionality and services installed on the FSSBMS apparatus.

In block 277 of the method 260 shown in FIG. 5B, an authorized user/administrator for the FSSBMS apparatus 202A is given an option to enable remote access to FSS functionality and services (e.g., by one or more of the remote web-access client devices 300A and 300B shown in FIG. 2). Additional details regarding enabling remote access to FSS functionality and services is discussed below in connection with the method 280 outlined in FIG. 12. In any event, whether or not remote access is enabled, in block 278 of FIG. 5B, authorized FSS users in the trusted LAN 200A, using the LAN client computing devices 206A and 206B (with installed respective FSS client applications) may upload one or more files to the FSS file system on the FSSBMS apparatus 202A, and edit files, share files, and synchronize one or more files between the FSS file system and one or more other LAN client computing devices. In block 279, to provide for redundant storage and backup recovery of data relating to FSS functionality and services, relevant data in the FSS database may be exported and added to the second logical volume storing the FSS file system, and the second logical volume may be processed (e.g., in a manner similar to that discussed in connection with FIG. 6 below) to generate one or more backup recovery points for the FSS server application; thereafter, the second logical volume and the one or more recovery points for the FSS server application may be transmitted to the trusted backup storage domain 500, and recovered if/as needed from the domain 500 to restore and instantiate the FSS server application based on the one or more recovery points.

Figure 6:
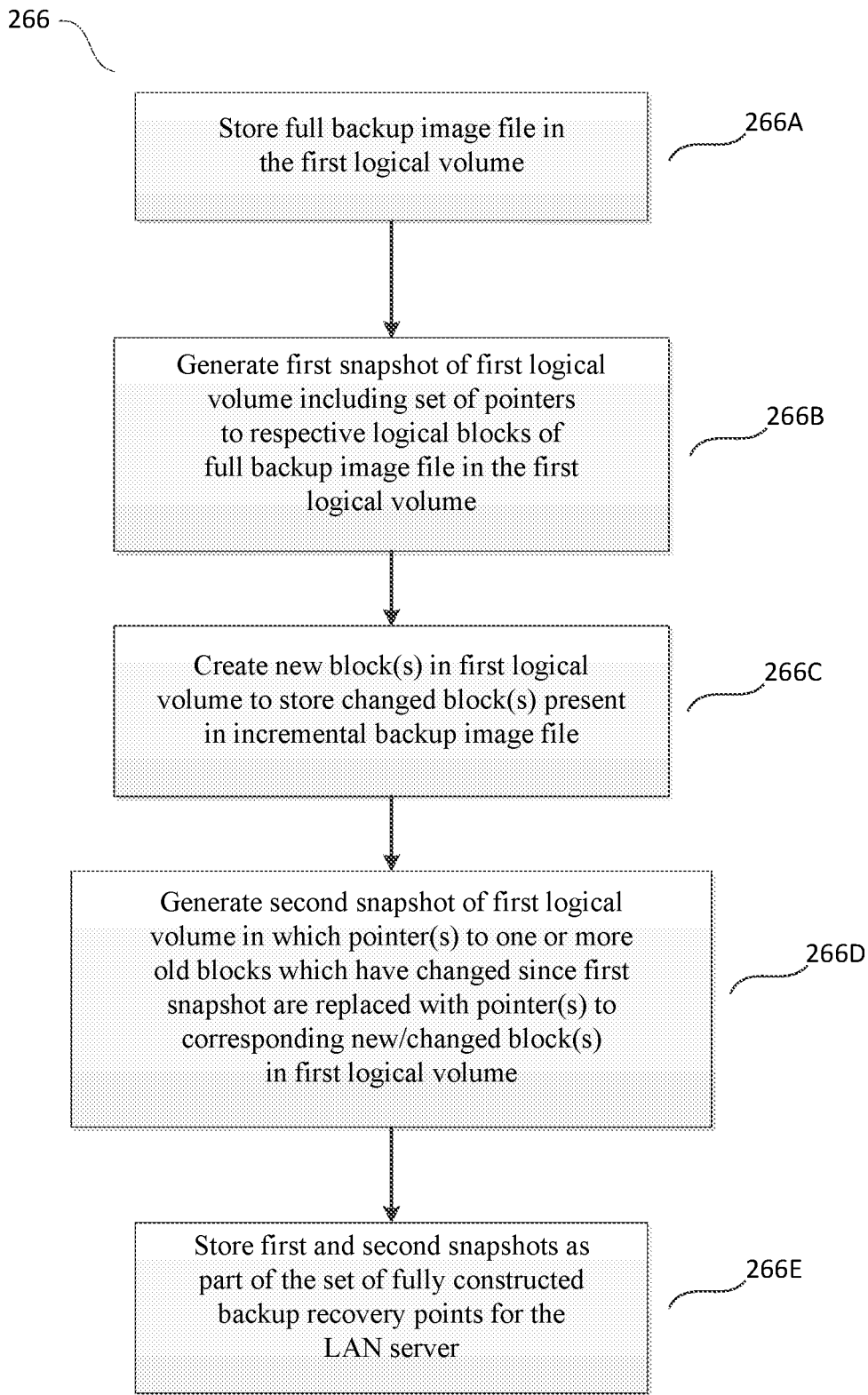
FIG. 6 illustrates additional aspects of the method shown in FIGS. 5A and 5B, relating to copy-on-write snapshots employed to generate backup recovery points according to the inventive concepts discussed herein.

FIG. 6 illustrates additional aspects of the portion of the method 260 shown in FIG. 5A, and particularly block 266, relating to copy-on-write snapshots employed to generate backup recovery points, according to the inventive concepts discussed herein. In some implementations, the generation of backup recovery points based on disk image files for a particular file system is based on "snapshots" of a collection of full and incremental image files associated with the file system stored as a logical volume. As would be readily appreciated by those of skill in the relevant arts, and for purposes of the present disclosure, a "snapshot" of a logical volume containing successive blocks of data is a set of pointers to memory locations storing the respective blocks of the logical volume at a given instant of time. Thus, if the logical volume is formatted as a VMDK container, a first snapshot of the logical volume includes a first set of pointers to the respective blocks in the VMDK container at a first point in time, and a second snapshot of the logical volume includes a second set of pointers to the respective blocks in the VMDK container at a second point in time. In implementations in which the ZFS® file system is employed, each pointer in a snapshot includes a 256-bit checksum of the block to which it points, and this checksum is verified when the block is read.

With the foregoing in mind, and turning to FIG. 6 and the additional aspects of block 266 of FIG. 5A, in block 266A a full backup image file 246A for the first LAN server 204A is stored in a first logical volume in the memory (e.g., the first logical volume $256A_1$ shown in FIG. 4). For purposes of the present discussion, the full backup image file includes a data block <A>. In method block 266B, a first snapshot of the first logical volume is generated, in which the first snapshot includes a set of pointers to respective logical blocks of the full backup image file in the first volume, including a first pointer to the data block <A>. The FSSBMS apparatus then receives (from the backup agent on the first LAN server) a first incremental backup image 248A for the first LAN server, which contains only blocks of the server file system that have changed since the full backup image was taken (and identifiers for these changed blocks). For purposes of illustration, we presume that for the first incremental backup image, the data contents in data block <A> of the previous full backup image has changed such that it is now block <A'>. Rather than replace the previously stored data block <A> in the first logical volume with the changed block <A'> from the incremental backup image, in method block 266C a new (e.g., unused) data block is added to the first logical volume so as to store the changed data block <A'> in the incremental backup image. Then, in method block 266D, a second snapshot is taken of the first logical volume; in the second snapshot, the original first pointer to the data block <A> is substituted with a new pointer in memory to the changed data block <A'> that was newly added to the first logical volume, and the other pointers in the second snapshot to all other unchanged data blocks in the first logical remain the same. Thus, each unique data block from respective backup images is saved only once in the first logical volume, and is pointed to in any snapshot that relies on that data block for reconstruction of a full backup image at a given point in time. This process is referred to as "copy-on-write snapshots," with each successive snapshot constituting a new version of an immediately prior snapshot. As indicated in method block 266E of FIG. 6, a set of versioned snapshots acquired in this manner (including the first and second snapshots and additional snapshots as taken) constitutes a set of fully constructed recovery points for the first LAN server as a function of time.

Relay Server Cluster

With reference again for the moment to FIG. 2, and turning back to consideration of various FSS features, in some implementations secure remote access to the FSS functionality and services provided by the FSS server application and file system installed on the FSSBMS apparatus 202A behind the firewall in the trusted LAN 200A is facilitated, without changing firewall rules/network configuration for the trusted LAN 200A, via the relay server cluster 100. More specifically, the relay server cluster "relays" FSS data traffic between one or more of the remote web-access client devices 300A and 300B (with installed respective FSS client applications 302A and 302B) and the FSSBMS apparatus 202A in the trusted LAN 200A; the relay server cluster 100 may similarly relay FSS data traffic between one or more of the remote web-access client devices and another FSSBMS apparatus behind the firewall of another trusted LAN, such as the LAN 200B. In some implementations, while not shown explicitly in FIG. 2, the relay server cluster 100 may be operated and maintained within the trusted backup storage domain 500 shown in FIG. 2.

Although the construct of remote access to the FSSBMS apparatus via a relay server cluster is described herein in some implementations in connection with FSS functionality and services, it should be appreciated that various inventive concepts relating to remote access to a private network appliance (or "private server") behind a firewall of a trusted LAN, via a relay server cluster, may be applied more generally beyond the specific examples involving FSS functionality and services. In particular, as noted above, the FSSBMS apparatus 202A is merely one specific example of such a private server in that it is configured to provide the particular functionalities of FSS and BMS integrated in a single network appliance. Other types of private servers for which remote access is facilitated via a relay server cluster according to the inventive concepts herein may implement different types of functionalities or services. Accordingly, in the discussion that follows, an FSSBMS apparatus is to be understood as representative of a broader class of private servers to which remote access from beyond a firewall may be facilitated.

FIG. 7 schematically illustrates communicative coupling between one of the remote web-access client computing devices shown in FIG. 2 (i.e., the remote client computing device 300A) and the FSSBMS apparatus 202A in the trusted LAN 200A, via the relay server cluster 100, according to the inventive concepts discussed herein. In FIG. 7, for purposes of illustration and simplicity, the router 208A of the trusted LAN 200A is labeled as "FIREWALL," and specific illustrative reference to the Internet 400 is omitted; however, it is to be understood that communicative coupling between the remote web-access client computing device 300A and the relay server cluster 100, and between the relay server cluster 100 and the FSSBMS apparatus 202A, occur via particular secure protocols on the Internet 400, as more generally illustrated in FIG. 2. In particular, as illustrated in the example of FIG. 7, Hypertext Transfer Protocol over Secure Socket Layer (HTTPS) is used for secure communications 402 (over the Internet 400) between the client computing device 300A and the relay server cluster 100, and a reverse Secure Shell (SSH) tunnel 404 is used for secure communications (over the Internet 400) between the relay server cluster 100 and the FSSBMS apparatus 202A. As would be readily appreciated by those of skill in the relevant arts, HTTPS is a secure communication protocol involving authentication of visited websites/domains and protection of the privacy and integrity of exchanged data via bidirectional encryption. On the other hand, an SSH tunnel comprises an encrypted communication channel through which unencrypted data traffic may be securely transferred over an untrusted network. In various aspects, an SSH tunnel involves repackaging data traffic in a different form so as to hide the nature of the data traffic running through the encrypted tunnel; in one example, the tunneling protocol works by using the data portion (payload) of first data packets serving as the tunnel to carry the actual packets of data traffic that need to be transferred (perhaps in another protocol), and then encrypting the "tunnel" packets. Thus, in one aspect, tunneling may be viewed as a layered protocol of packets within packets, with the outer or "tunnel" packets being encrypted.

With reference again to FIG. 2, in one example the relay server cluster 100 comprises multiple physical server computing devices 102A, 102B, and 102C that implement multiple Device Access Services (DAS) servers (DASC1, 104A; DASC3, 104B; DASC5, 104C) and multiple name servers (NS1, 106A; NS2, 106B). The multiple physical server computing devices implementing multiple DAS servers and multiple name servers provide redundant relay resources for supporting substantially uninterrupted communications between the remote client computing devices 300A and 300B and respective FSSBMS apparatuses 202A and 200B in trusted LANs 200A and 200B. While three physical server computing devices implementing three DAS servers and two name servers are shown in FIG. 2 for purposes illustrating an example of the relay server cluster 100, it should be appreciated that different numbers of physical servers implementing different numbers of DAS servers and name servers are contemplated in connection with the inventive concepts disclosed herein in various implementations of the relay server cluster. For purposes of the present discussion, pertinent details of one of the physical servers 102A, one of the DAS servers 104A, and one of the name servers 106A will be discussed herein as representative of other similar corresponding devices that may be present in various implementations of the relay server cluster 100.

Figure 8:
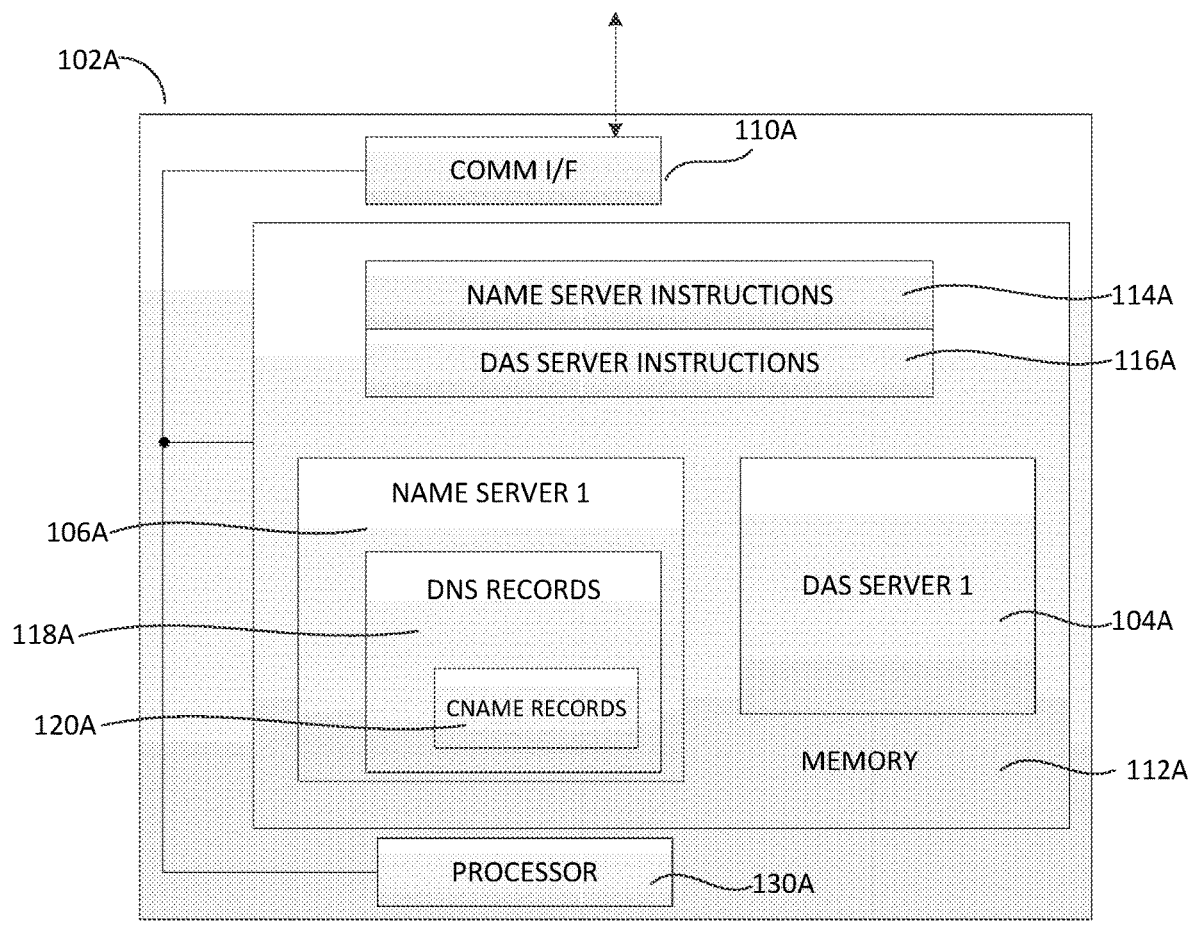
FIG. 8 illustrates various details of one of the physical server computing devices of the relay server cluster shown in FIG. 2, according to the inventive concepts discussed herein.

To this end, FIG. 8 illustrates various details of the physical server computing device (or simply "physical server") 102A of the relay server cluster 100 shown in FIG. 2, according to the inventive concepts discussed herein. The physical server 102A comprises one or more communication interfaces 110A, a memory 112A, and one or more processors 130A communicatively coupled to the memory and the communication interface(s). As would be readily appreciated by those of skill in the relevant arts, a variety of hardware and software components relating to computer technologies and Internet communications may be employed to implement various instantiations of the physical server 102A in a manner consistent with the inventive concepts disclosed herein.

With reference again to FIG. 2, the communication interface(s) 110A of the physical server 102A generally serve to facilitate communications with other devices in the relay server cluster 100 (e.g., the other physical servers 102B and 102C; the router(s) 108) and ultimately with the Internet 400 (e.g., via the router 108). The memory 112A may be architected and configured in a variety of manners (one example of which is discussed above in connection with FIG. 4), and stores a variety of processor-executable instructions (e.g., in the form of "applications") for execution by the processor(s) 130A, as well as various data files associated with executable applications and instances of virtual servers running on the physical server. For example, as shown in FIG. 8, the memory 112A of the physical server 102A may store name server executable instructions 114A, and Device Access Services (DAS) server executable instructions 116A, as well as instances of a virtual first name server 106A and a virtual first DAS server 104A. Additionally, the memory 112A may store various files or records associated with the operation of one or both of the first name server 106A and the first DAS server 104A, such as DNS records 118A for the first name server, which DNS records may include one or more Canonical Name (CNAME) records 120A.

Figure 9:
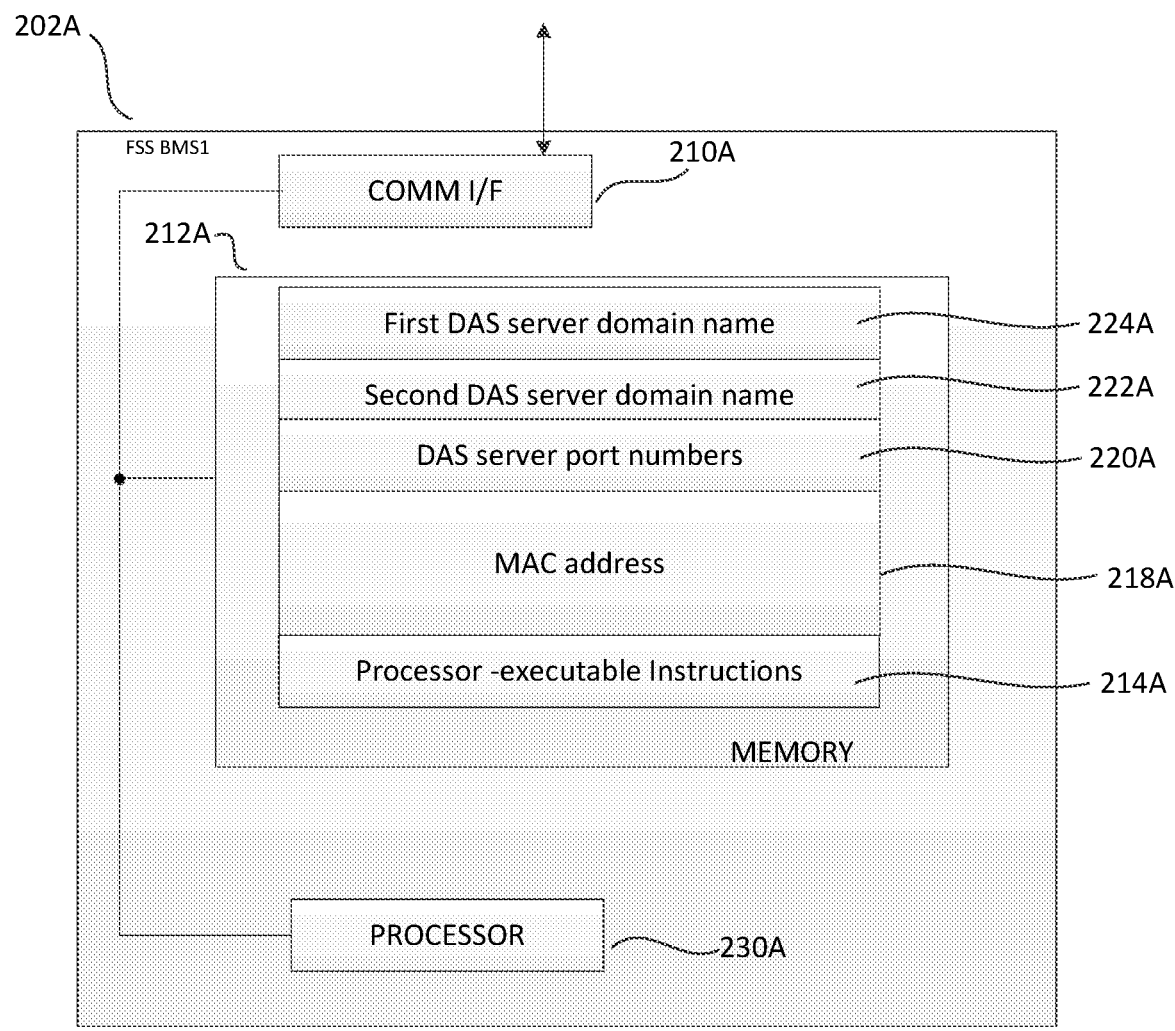
FIG. 9 illustrates various details of one of the FSSBMS apparatuses shown in FIG. 2 relating to communications with the relay server cluster shown in FIG. 2, according to the inventive concepts discussed herein.

In other aspects relating to providing secure access via the relay server cluster to the FSS functionality and services provided by the FSSBMS apparatus 202A in the trusted LAN 200A, the FSSBMS apparatus itself stores various information and executes various instructions to work in tandem with the relay server cluster and, for example, the first physical server 102A shown in FIG. 8. To this end, FIG. 9 illustrates various details of the FSSBMS apparatus 202A that particularly relate to communications with the relay server cluster, according to the inventive concepts discussed herein. As illustrated in FIG. 9, similar elements for the apparatus 202A are shown from FIG. 3, with a primary difference being the memory 212A showing memory contents that particularly relevant to facilitating remote access via the relay server cluster. More specifically, the memory 212A in FIG. 9 stores processor-executable instructions 214A for carrying out the various functions relating to remote access as discussed in greater detail below (e.g., in connection with FIGS. 11 and 12), as well as data relating to a first DAS server domain name 224A, a second DAS server domain name 22A, DAS server port numbers 220A, and a MAC address 218A for the apparatus 202A.

Figure 10:
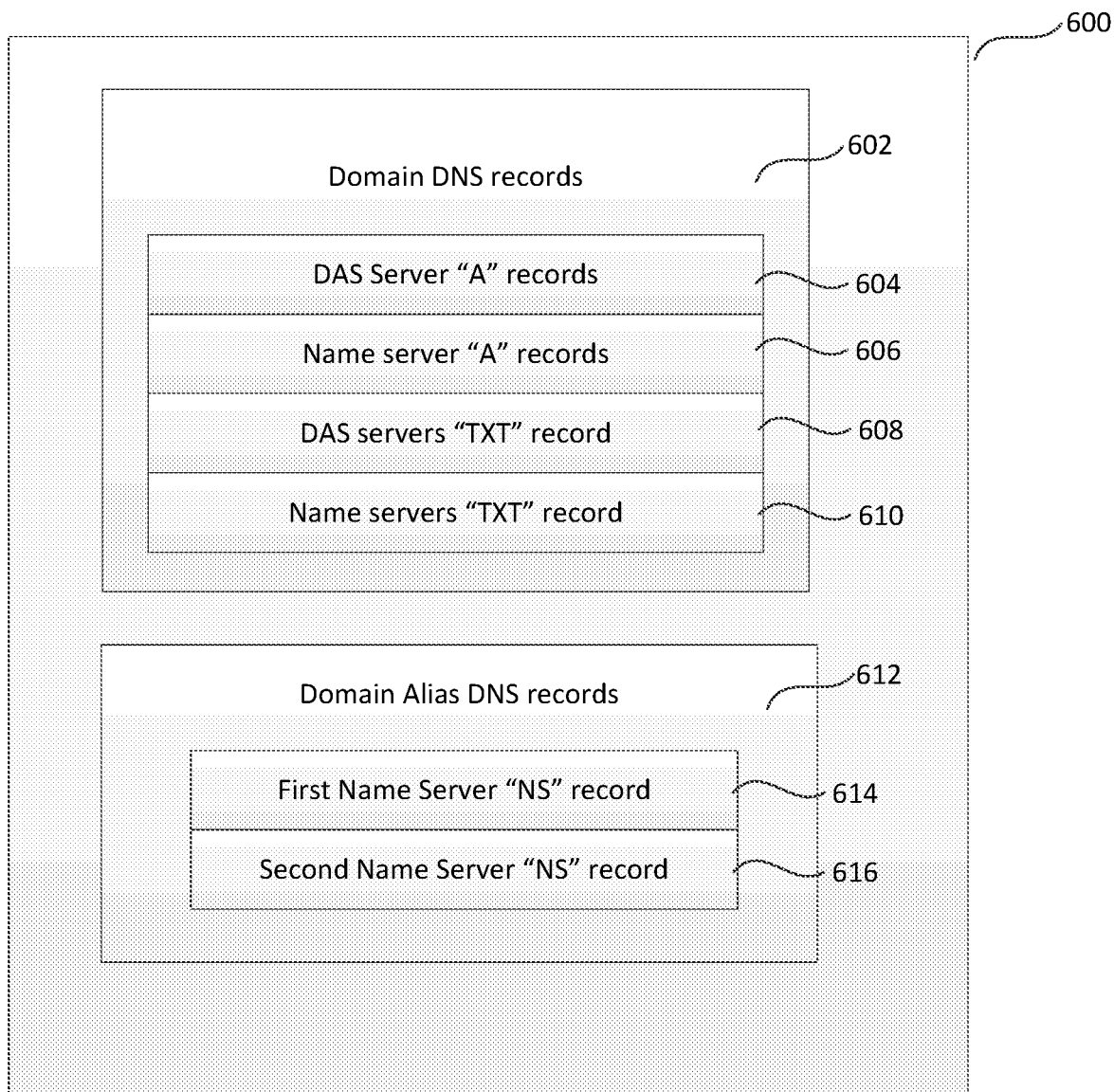
FIG. 10 illustrates various details of the Domain Name Service (DNS) records kept in the domain name registrar/DNS hosting service shown in FIG. 2, according to the inventive concepts discussed herein.

In yet other aspects relating to providing secure access via the relay server cluster to the FSS functionality and services provided by the FSSBMS apparatus 202A in the trusted LAN 200A, a number of Domain Name System (DNS) records maintained by the domain name registrar/DNS hosting service 600 shown in FIG. 2 are instrumental in facilitating such secure access. To this end, FIG. 10 illustrates various details of the DNS records kept in the domain name registrar/DNS hosting service 600, according to the inventive concepts discussed herein. In some implementations, the trusted backup storage domain 500 oversees and maintains operation of the relay server cluster 100, and thus maintains domain DNS records 602 that include various entries relating to the relay server cluster 100.

For example, the domain DNS records 602 for the trusted backup storage domain 500 may include DAS server "A" records 604 and name server "A" records 606. As would be readily appreciated by those of skill in the relevant arts, a DNS "A" record provides an IP address corresponding to a domain name for a given network appliance; accordingly, the DAS server "A" records 604 include at least a first record that maps a first domain name of the first DAS server of the relay server cluster to a corresponding IP address, and a second record that maps a second domain name of the second DAS server of the relay server cluster to a corresponding IP address. If the relay server cluster includes additional DAS servers according to other implementations, the DAS server "A" records 604 will include additional similar records. Similarly, the name server records 606 include at least a first record that maps a first domain name of the first name server of the relay server cluster to a corresponding IP address, and a second record that maps a second domain name of the second name server of the relay server cluster to a corresponding IP address.

In addition to various "A" records, various "TXT" (or text) records may be stored in the domain DNS records 602. As would be readily appreciated by those of skill in the relevant arts, a DNS "TXT" record is used to associate arbitrary or unformatted text with a particular domain name; this particular domain name may be used by a network appliance to request the contents of the corresponding "TXT" record. In various implementations of the relay server cluster, such "TXT" records are employed to provide lists, to requesting network devices, of the various servers instantiated in the relay server cluster; for example, the DAS servers "TXT" record 608 provides a list of the domain names for all of the DAS servers in the relay server cluster in response to a query using a first particular domain name, and the name servers "TXT" record 610 provides a list of the domain names for all of the name servers in the relay server cluster in response to a query using a second particular domain name.

To facilitate ease of access by one or more remote web-access client computing devices to the FSSBMS apparatus 202A, as discussed above the FSSBMS apparatus is assigned a domain name alias that may be used for remote access, irrespective of a particular DAS server in the relay server cluster to which the FSSBMS apparatus may be securely connected at any given time via a reverse SSH tunnel. Accordingly, with reference again to FIG. 10, a set of domain alias DNS records 612 is also maintained with the domain name registrar/DNS hosting service 600 to accommodate the domain name alias for the FSSBMS apparatus 202A (as well as other FSSBMS apparatuses that may be in other trusted LANs to which remote access is desired). In particular, the domain alias DNS records 612 include a first name server "NS" record 614 and a second name server "NS" record 616. As would be appreciated by those of skill in the relevant arts, a DNS "NS" record is used to identify one or more alternative DNS name servers responsible for a particular "zone" or domain.

In effect, the "NS" records 614 and 616 shown in FIG. 10 indicate that dedicated name servers other than the domain name registrar/DNS hosting service 600 are employed to resolve domain names that include the domain name alias for the FSSBMS apparatus 202A. To this end, the first name server "NS" record 614 includes the domain name of the first domain name server 106A of the relay server cluster, and the second name server "NS" record 616 includes the domain name of the second name server 106B of the relay server cluster. In turn, as discussed elsewhere herein (and shown in FIG. 8), the name servers themselves store DNS records (e.g., 118A) that include one or more CNAME records (e.g., 120A) that point the domain name alias of the FSSBMS apparatus 202A to the canonical domain name for the particular DAS server of the relay server cluster to which the FSSBMS apparatus is securely connected at any given time via a reverse SSH tunnel. In various implementations, a MAC address for the FSSBMS apparatus 202A (see MAC address 218A in FIG. 9) serves as a subdomain for the domain name alias.

In one implementation of the concepts described herein by the Applicant, the Applicant maintains with the domain name registrar/DNS hosting service 600 the trusted backup storage domain "datto.com" and uses the domain alias "dattoconnect.com" to facilitate remote access to FSSBMS apparatuses behind firewalls of trusted LANs. For a given FSSBMS apparatus such as the FSSBMS apparatus 202A, the domain name alias for the apparatus may be given by "<mac>.dattoconnect.com," wherein <mac> corresponds to the MAC address 218A indicated in FIG. 9.

With the foregoing in mind, Table 1 below provides exemplary domain names for a given FSSBMS apparatus and the various servers of the relay server cluster involved in facilitating secure remote access to the FSSBMS apparatus:

TABLE 1

| Network device | Example domain name |
| --- | --- |
| FSSBMS apparatus 202A, 202B, etc. | <mac>.dattoconnect.com |
| First DAS server 104A | dasc1.connect.das.datto.com |
| Second DAS server 104B | dasc3.connect.das.datto.com |
| Third DAS server 104C (if present) | dasc5.connect.das.datto.com |
| First name server 106A | ns1.connect.das.datto.com |
| Second name server 106B | ns2.connect.das.datto.com |

Based on the foregoing exemplary domain names, Table 2 below provides example contents for the domain DNS records 602 (for "datto.com") and the domain alias DNS records 604 (for "dattoconnect.com") maintained by the domain name registrar/DNS hosting service 600:

TABLE 2

| Domain DNS records for "datto.com" (602) | |
| --- | --- |
| DAS Server "A" records (604) | *.dasc1.connect.das.datto.com A 1.1.1.1<br>dasc1.connect.das.datto.com A 1.1.1.1<br>*.dasc3.connect.das.datto.com A 1.1.1.3<br>dasc3.connect.das.datto.com A 1.1.1.3<br>*.dasc5.connect.das.datto.com A 1.1.1.5<br>dasc5.connect.das.datto.com A 1.1.1.5 |
| Name server "A" records (606) | ns1.connect.das.datto.com A 1.1.1.7<br>ns2.connect.das.datto.com A 1.1.1.9 |
| DAS servers "TXT" record (608) | _v2.dasc.connect.das.datto.com TXT<br>"dasc1.connect.das.datto.com<br>dasc3.connect.das.datto.com<br>dasc5.connect.datto.com" |
| Name servers "TXT" record (610) | _v2.ns.connect.das.datto.com TXT<br>"ns1.connect.das.datto.com<br>ns2.connect.das.datto.com" |
| Domain Alias DNS records for "dattoconnect.com" (612) | |
| First name server "NS" record (614) | @NS ns1.connect.das.datto.com |
| Second name server "NS" record (616) | @NS ns2.connect.das.datto.com |

Figure 11:
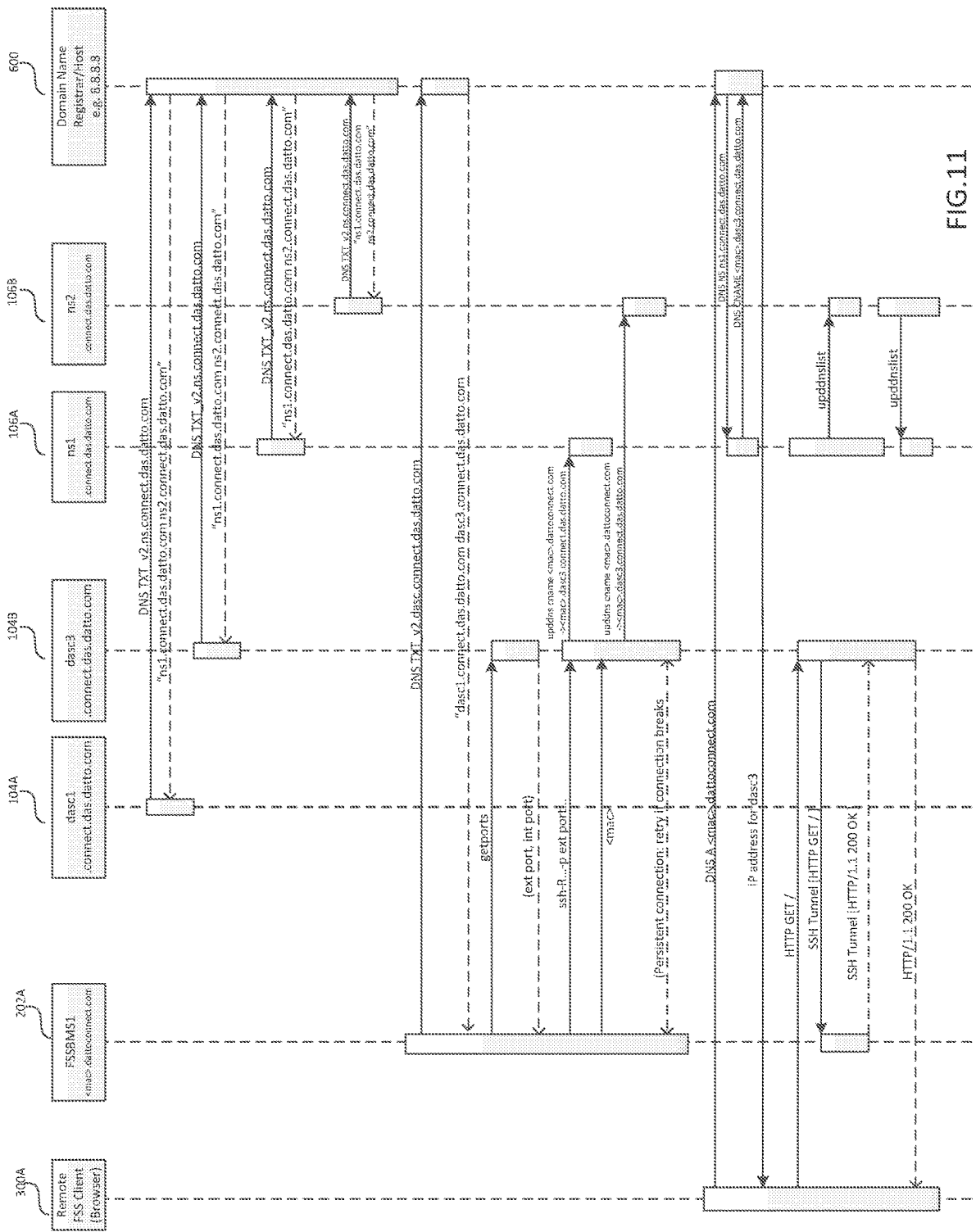
FIG. 11 schematically illustrates information flows between the various entities shown in FIG. 2 to facilitate communications between one of the remote web-access client devices shown in FIG. 2 and one of the FSSBMS apparatuses of FIG. 2 behind a firewall in a trusted LAN, according to the inventive concepts discussed herein.

With the foregoing example domain names and DNS records in mind from Tables 1 and 2, FIG. 11 schematically illustrates information flows between the various entities shown in FIG. 2 to facilitate secure remote access communications between one of the remote web-access client devices shown in FIG. 2 (e.g., remote client device 300A, shown on the top far left of FIG. 11) and one of the FSSBMS apparatuses 202A (immediately to the right of the remote client device 300A), via the various servers of the relay server cluster, according to the inventive concepts discussed herein. In FIG. 11, the remote client device 300A, FSSBMS apparatus 202A, DAS servers 104A and 104B, name servers 106A and 106B, and domain name registrar/DNS hosting service boo are shown across the top of the figure with their associated domain names. Vertical dashed lines extend downward from each device to provide references for elongated vertically-oriented rectangular boxes indicating sources and destinations of communications to and from a given device. The flow of communications in FIG. 11 is first described immediately below, followed by a description of respective methods performed by the FSSBSM apparatus 202A, and then the relay server cluster 100, to implement the communication flows shown in FIG. 11.

As a general matter of relay server cluster functionality independent of the connectivity of any one FSSBMS apparatus to the relay server cluster, as shown in the top center of FIG. 11 each of the DAS servers 104A and 104B, as well as each of the name servers 106A and 106B, send queries to the designated domain name "_v2.ns.connect.das.datto.com" to retrieve the contents of the name servers "TXT" record 610 shown in FIG. 10 and in Table 2 above (i.e., the list of all of the domain names for all name servers in the cluster). In this manner, each of the DAS servers and name servers is aware of all of the name servers in the relay server cluster at any given time and their corresponding domain names; this is instrumental as discussed further below to maintain updated DNS records in the name servers regarding the connectivity of one or more particular FSSBMS apparatuses to one of the DAS servers in the cluster at any given time.

The queries made by the DAS servers and name servers to retrieve the list of name server domain names may be made periodically with various degrees of frequency. As noted above, while hopefully an uncommon occurrence, one or more name servers in the cluster may be swapped out or decommissioned from time to time (for regular maintenance or repair), and replaced with one or more alternative name servers, to ensure reliable and continuing operations of the relay server cluster—thus, the owner of the trusted backup storage domain (or other domain in which the relay server cluster resides) may update the name servers "TXT" record 610 accordingly to reflect such changes if/as they occur. Thus, periodic queries by the DAS servers and the name servers to obtain the list of name server domain names ensure essentially seamless operation of the relay server cluster.

To enabling remote access to the FSSBMS apparatus 202A behind the firewall of the first trusted LAN 200A, as indicated in the middle left of FIG. 11 the FSSBMS apparatus first queries the domain name registrar/DNS hosting service boo (e.g., via the designated domain name "_v2.dasc.connect.das.datto.com") for the contents of the DAS server "TXT" record 608, i.e., the list of domain names of all available DAS servers in the relay server cluster 100. As discussed above in connection with the name servers, while hopefully an uncommon occurrence, one or more DAS servers in the cluster may be swapped out or decommissioned from time to time (for regular maintenance or repair), and replaced with one or more alternative DAS servers, or additional DAS servers may be added to the cluster (e.g., based on remote client traffic demands) to ensure reliable and continuing operations of the relay server cluster—thus, the owner of the trusted backup storage domain (or other domain in which the relay server cluster resides) may update the DAS servers "TXT" record 608 accordingly to reflect such changes if/as they occur. The FSSBMS apparatus 202A then selects (e.g., randomly) one available DAS server in the cluster 100 based on the domain names in the requested "TXT" record 608 to seek instantiation of a reverse Secure Shell (SSH) tunnel with the selected DAS server.

In FIG. 11, for purposes of illustration the FSSBMS apparatus 202A has selected the second DAS server 104B with the domain name "dasc3.connect.das.datto.com" to instantiate a reverse SSH tunnel. To this end, the FSSBMS apparatus 202A requests from the second DAS server 104B ("getports") an external port number (and in some cases an internal port number) that the DAS server will use to open the tunnel ("ext port, int port"). Based on one or more of the retrieved port numbers, the FSSBMS apparatus 202A then sends a command to the selected second DAS server 104B to open the reverse SSH tunnel ("ssh -R . . . -p ext port . . . "), and in response the second DAS server 104B then opens the tunnel as a "persistent" connection. The SSH tunnel is considered a "reverse" tunnel because the FSSBMS apparatus 202A is sending the request to the second DAS server 104B to open the tunnel, but initial information originating from a remote client device 300A will be travelling in the reverse direction once the tunnel is opened (i.e., from the second DAS server 104B to the FSSBMS apparatus 202A).

The FSSBMS apparatus 202A also forwards to the selected second DAS server its MAC address (<mac>); as discussed above, this MAC address is employed as part of a domain name alias for the FSSBMS apparatus 202A ("<mac>.dattoconnect.com"). In turn, as shown in the center of FIG. 11, the second DAS server 104B forwards the FSSBMS apparatus MAC address to both the first name server 106A and the second name server 106B to update the DNS records stored in the name servers (e.g., the DNS records 118A shown in FIG. 8 for the first name server). In particular, the CNAME records of the name servers (e.g., the CNAME record 120A shown in FIG. 8 for the first name server 106A) are updated to point the domain name alias "<mac>.dattoconnect.com" to the canonical domain name "<mac>.dasc3.connect.das.datto.com" for the second DAS server; this canonical domain name will in turn be resolved to the appropriate IP address for the second DAS server via the DAS server "A" records 604 (see FIG. 10) stored in the domain DNS records 602 at the domain name registrar/DNS hosting service 600 (see Table 2 above). As shown in the bottom right of FIG. 11, the DNS records of each of the name servers are updated/synchronized regularly (e.g., every five seconds) so that the CNAME records at any given time reflect the DAS server to which a given FSSBMS apparatus is connected via a reverse SSH tunnel.

Once a reverse SSH tunnel is established between the FSSBMS apparatus 202A and the second DAS server 104B in FIG. 11, and the DNS records of both name servers 106A and 106B of the cluster include a CNAME record for the domain name alias of the FSSBMS apparatus pointing to the second DAS server, the remote client device may access the FSSBMS apparatus. In particular, as shown in the bottom left of FIG. 11, an authorized remote user may enter the domain name alias for the FSSBMS apparatus ("<mac>.dattoconnect.com") in a browser of the remote web-enabled client device 300A, and this domain name alias ultimately will be resolved to the IP address for the second DAS server 104B (and returned to the browser of the remote client device 300A); this occurs by virtue of the name server "NS" records 614 and 616 of the domain alias DNS records 612 for "dattoconnect.com" stored in the domain name registrar/DNS hosting service 600 (see Table 2) and the CNAME records stored in the first and second name servers 106A and 106B. In FIG. 11, an example is illustrated in which the DNS hosting service 600 redirected the browser resolution inquiry to the first name server 106B for the CNAME record pointing to the second DAS server domain name, but the inquiry could have just as easily been directed to the second name server 106B—in any event, the inquiry ultimately is resolved back at the hosting service 600 by virtue of the DAS server "A" records 604 (see Table 2), and the corresponding IP address for the second DAS server (e.g., 1.1.1.3) is returned to the browser of the client device 300A.

Subsequently, as shown in the bottom left of FIG. 11, the client device 300A may access the second DAS server at the appropriate IP address using Hypertext Transfer Protocol over Secure Socket Layer (HTTPS), to ultimately securely communicate with the FSSBMS apparatus 202A via the second DAS server and the reverse SSH tunnel.

Figure 12:
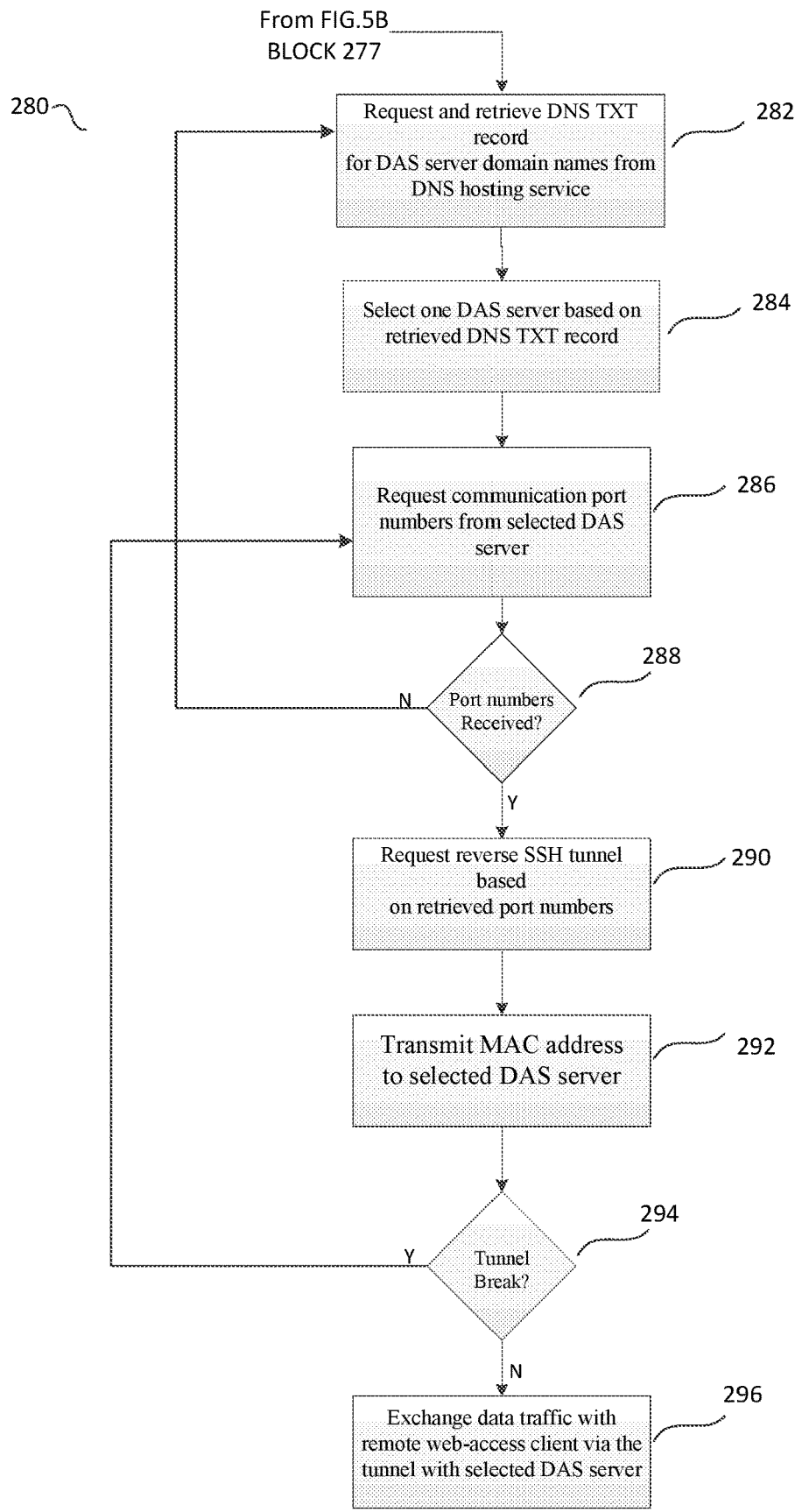
FIG. 12 illustrates an example of a method performed by one of the FSSBMS apparatuses shown in FIG. 2 to implement some of the information flows illustrated in FIG. 11, according to the inventive concepts discussed herein.

FIG. 12 illustrates an example of a method 280 performed by the FSSBMS apparatus 202A to implement some of the information flows illustrated in FIG. 11, according to the inventive concepts discussed herein. As shown in FIG. 12, the method 280 may be initiated from block 277 in FIG. 5B (e.g., if an administrator of the FSSBMS apparatus chooses to enable remote FSS access).

In block 282 of FIG. 12, the DNS "TXT" records for the DAS server domain names (e.g., the "TXT" record 608 in FIG. 10) is requested and retrieved, and in block 284 one of the DAS servers is selected (e.g., at random) based on the retrieved "TXT" record. In block 286, one or more communication port numbers (e.g., for an external port) are requested from the selected DAS server. In block 288, if for any reason the port number(s) are not received from the selected DAS server (e.g., within a predetermined timeout period, for example twenty to thirty seconds), the method presumes the selected DAS server is unavailable and returns to block 282. If the port number(s) are received in block 288, the method 280 proceeds to block 290 to request a reverse SSH tunnel based on the retrieved port numbers. In block 292, the FSSBMS apparatus further transmits its MAC address to the selected DAS server. Once the tunnel is established it is intended to be "persistent." That said, in block 294, the method 280 monitors the tunnel to ensure that it remains open and not broken—as part of the SSH protocol, periodic tunnel status messages are exchanged between the FSSBMS apparatus and the selected DAS server, and if there is some period of inactivity (e.g., twenty to thirty seconds) the tunnel is presumed to be broken. In this case, from block 294, the method 280 returns to block 286, where it will try to once again acquire from the same previously selected DAS server updated communication port numbers. If ultimately there is no response from the selected DAS server, once again in block 288 the method will return to block 282 to repeat the method 280. If on the other hand the tunnel persists, in block 296 data traffic may be exchanged with the remote web-access client 300A via the tunnel and the selected DAS server.

Figure 13:
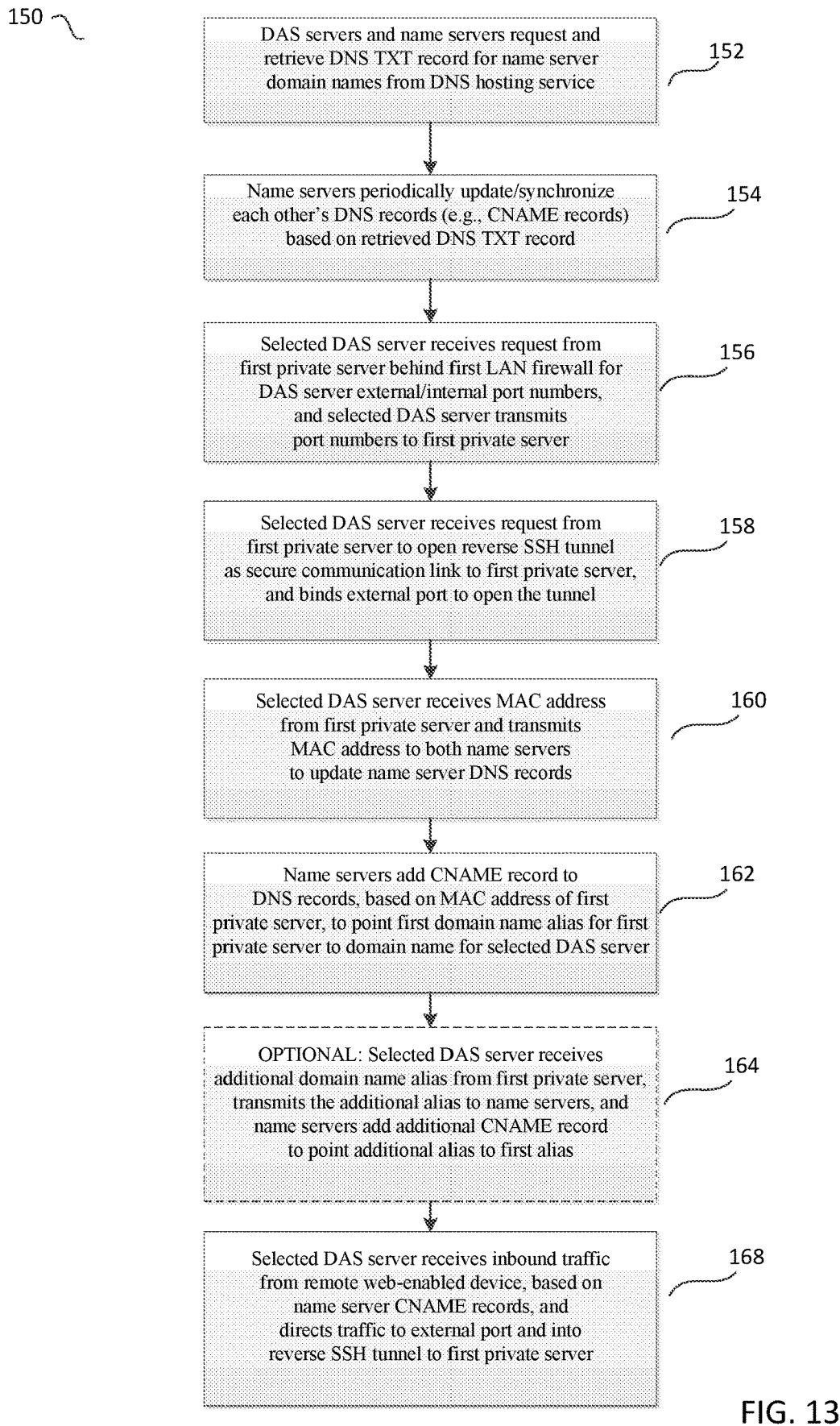
FIG. 13 illustrates an example of a method performed by the relay server cluster shown in FIG. 2 to implement some of the information flows illustrated in FIG. 11, according to the inventive concepts discussed herein.

FIG. 13 illustrates an example of a method 150 performed by the relay server cluster shown in FIG. 2 to implement some of the information flows illustrated in FIG. 11, according to the inventive concepts discussed herein. In block 152, the DAS servers and the name servers request and retrieve, from the hosting service boo, the DNS "TXT" record for the name server domain names. In block 154, the name servers periodically update/synchronize each other's DNS records (e.g., CNAME records) based on the retrieved DNS "TXT" record. In block 156, one of the DAS servers selected by the FSSBMS apparatus (or more generally a "private server" behind a LAN firewall) receives a request for its external and/or internal port numbers and returns the port number(s) to the apparatus. In block 158, the selected DAS server receives a request to open the reverse SSH tunnel as a secure communication link to the FSSBMS apparatus, and binds its external port to open the tunnel.

In block 160 of the method 150 shown in FIG. 13, the selected DAS server receives the MAC address of the FSSBMS apparatus and forwards the MAC address to both name servers so as to update the name server DNS records (e.g., CNAME records). In particular, in block 162, the name servers add a CNAME record to their respective DNS records, based on the MAC address, to point a first domain name alias for the FSSBMS apparatus (including the MAC address as a subdomain) to the domain name for the selected DAS server (that also includes the MAC address as a subdomain). In block 164, the selected DAS server optionally may receive an additional domain name alias from the FSSBMS apparatus, for which it transmits the additional alias to the name servers; in turn, the name servers add an additional CNAME record to point this additional alias to the previously received domain name alias for the FSSBMS apparatus. It should be understood that should an administrator for the FSSBMS apparatus wish to employ an additional alias for the FSSBMS apparatus, one or more appropriate DNS records for the domain used in the additional alias will need to be added to whatever name server may be employed by the LAN in which the FSSBMS apparatus is deployed. Finally, in block 168, the selected DAS server receives inbound traffic from the remote web-enabled client device, based on the CNAME records maintained by the name servers of the relay server cluster, and directs the traffic to the appropriate external port of the selected DAS server and into the reverse SSH tunnel to the FSSBMS apparatus.

Figure 14:
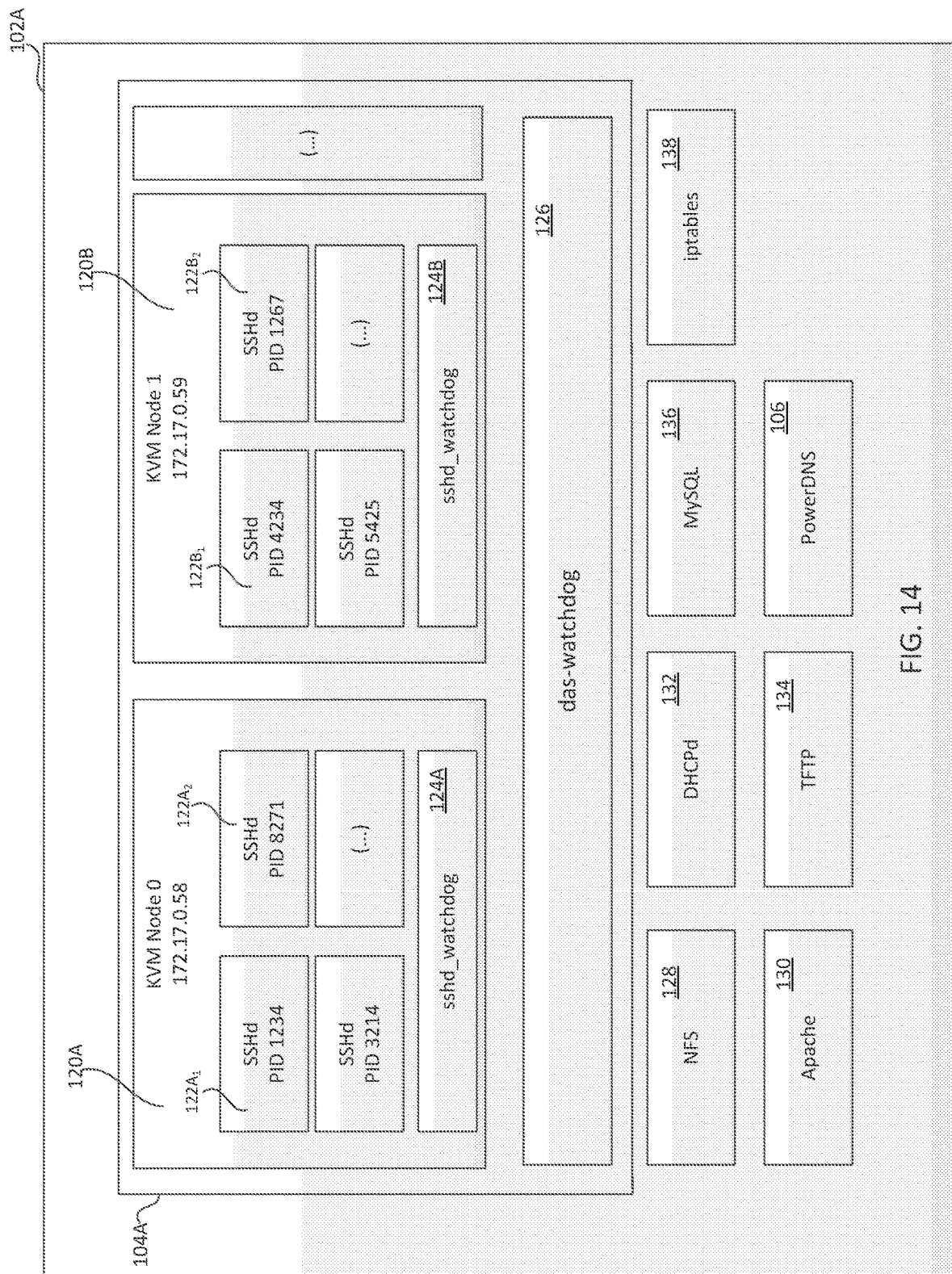
FIG. 14 illustrates various details of one of the physical server computing devices in the relay server cluster shown in FIG. 2, according to the inventive concepts discussed herein.

FIG. 14 illustrates various details of one of the physical server computing devices 104A in the relay server cluster 100 shown in FIG. 2, according to the inventive concepts discussed herein. As noted above, in one illustrative and non-limiting example, a given physical relay server in the relay server cluster may implement a logical or virtual DAS server and a logical or virtual name server. As shown in FIG. 14, in some implementations, a logical or virtual DAS server 104A may be implemented in a physical relay server 102A as multiple Kernel-Virtual Machine (KVM) nodes 120A and 120B each having a unique IP address and supporting some number of SSH daemons (SSHd) (e.g., $122A_1$, $122A_2$) having corresponding process IDs (PID). In one aspect, one SSHd runs for each remote client request to access a particular local FSSBMS apparatus. Each KVM node also may include an SSHd "watchdog" (sshd_watchdog) (e.g., 124A, 124B) that runs periodically to check if a reverse SSH tunnel between the corresponding KVM node and a local FSSBMS apparatus is broken; in such an event, the SSHd watchdog for the KVM node accordingly informs the virtual name server 106A (PowerDNS) and updates a database 136 (MySQL) to remove entries regarding the tunnel from the database.

The logical/virtual DAS server 104A shown in FIG. 14 also may include a DAS-watchdog 126. The DAS-watchdog monitors the KVM nodes and ensures that there are enough instantiated KVM nodes to handle all of the remote client requests to the logical DAS server (and corresponding processes initiated by the SSHds). In some implementations, the DAS-watchdog also may oversees various processes relating to name server identification, updating the DNS CNAME records of one or more other name servers in the cluster, and name server synchronization.

The example architecture for the physical server 102A shown in FIG. 14 also may include a Network File System (NFS) 128, i.e., a distributed file system protocol to allow remote client devices to access, via the Internet, files stored on the relay server. The architecture further may employ an Apache HTTP Server 130 (i.e., web server software to process requests via HTTP), iptables 138 (e.g., a configuration of chains of rules and tables for the treatment of packets to implement the relay server's own firewall), DHCP Daemon (DHCPd) 132 (e.g., a daemon to provide Dynamic Host Configuration Protocol (DHCP) service to the relay server, namely leasing of an IP address for the relay server to a remote client device seeking access to the server, Trivial File Transfer Protocol (TFTP) 134 (e.g., used for internal communications amongst various modules of the relay server), a Structured Query Language relational database management system (MySQL) 136 to store records relating to the SSH tunnels between different local FSSBMS apparatuses and the logical DAS server, and the logical/virtual name server 106 (e.g., PowerDNS).

CONCLUSION

While various inventive concepts have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A private server apparatus for a trusted local area network (LAN) protected by a firewall, the private server apparatus configured to establish and maintain at least one secure communication link to a relay server cluster outside of the trusted LAN and beyond the firewall so as to allow inbound data traffic to flow, via the Internet and the relay server cluster, from at least one remote web-access client device outside of the LAN and beyond the firewall to the private server apparatus behind the firewall, the private server apparatus comprising:
 at least one communication interface;
 memory to store processor-executable instructions; and
 at least one processor, communicatively coupled to the at least one communication interface and the memory, wherein upon execution of at least some of the processor-executable instructions by the at least one processor, the at least one processor:
 controls the at least one communication interface to request and retrieve, via the Internet, records associated with a first Device Access Services (DAS) server and a second DAS server;
 selects and designates one of the first DAS server and the second DAS server as the elected DAS server and designates the non-elected DAS server as the failover DAS server;
 controls the at least one communication interface of the private server apparatus to transmit a first request to the elected DAS server over a first external port number, wherein the first request body contains a second external port number, and further wherein the first request causes the elected DAS server to establish a first reverse encrypted tunnel for data transfer on the second external port number for facilitating data transfer between the private server apparatus and the elected DAS server;
 monitors the at least one communication interface to determine if the first reverse encrypted tunnel for data transfer breaks; and
 if the first reverse encrypted tunnel for data transfer breaks, controls the at least one communication interface of the private server apparatus to transmit a second request to the elected DAS server over the first external port number, wherein the second request body contains an updated external port number to communicate with the private server apparatus via the Internet;
 if the elected DAS server fails to respond to the second request, controls the at least one communication interface of the private server apparatus to transmit a third request to the failover DAS server over the first external port number, for a failover external port number of the failover DAS server used to communicate with the private server apparatus via the Internet;
 if the failover DAS server responds to the third request, controls the at least one communication interface of the private server apparatus to transmit a fourth request to the failover DAS server, to open a second reverse encrypted tunnel for data transfer between the private server apparatus and the failover DAS server using the failover external port number of the failover DAS server, wherein the second reverse encrypted tunnel for data transfer serves as the at least one secure communication link between the private server apparatus and the failover DAS server to allow the inbound data traffic to flow from the at least one remote web-access client device to the private server apparatus.

2. The private server apparatus of claim 1, wherein upon execution of the at least some of the processor-executable instructions, the at least one processor further:
 controls the at least one communication interface to transmit, via the Internet and to the elected DAS server, at least a portion of a first domain name alias for the private server apparatus to be used by the at least one remote web-access client device to access the private server apparatus via the relay server cluster and the at least one secure communication link.

3. The private server apparatus of claim 2, wherein the portion of the first domain name alias includes a Media Access Control (MAC) address for the private server apparatus.

4. The private server apparatus of claim 2, wherein the elected DAS server is configured to forward the at least a portion of the first domain name alias to at least one Domain Name System (DNS) server to update at least one DNS record stored at said at least one DNS server to include the at least a portion of the first domain name alias.

5. The private server apparatus of claim 4, wherein the at least one DNS record stored at said at least one DNS server comprises at least one Canonical Name (CNAME) record.

6. The private server apparatus of claim 1, wherein the records associated with the first DAS server and the second DAS server comprise Domain Name System (DNS) text records retrieved from a DNS server.

7. The private server apparatus of claim 1, wherein the at least one processor monitors the at least one communication interface to determine if the first reverse encrypted tunnel for data transfer breaks by sending periodic tunnel status messages.

8. The private server apparatus of claim 7, wherein the at least one processor determines that the first reverse encrypted tunnel has broken if no tunnel status message is received from the elected DAS server within a predetermined period.

9. The private server apparatus of claim 8, wherein the predetermined period is greater than or equal to 20 seconds and less than or equal to 30 seconds.

10. The private server apparatus of claim 1, wherein the at least one processor randomly selects and designates one of the first DAS server and the second DAS server as the elected DAS server and designates the non-elected DAS server as the failover DAS server.

11. A method for establishing and maintaining at least one secure communication link between a private server apparatus for a trusted local area network (LAN) protected by a firewall and a relay server cluster outside of the trusted LAN and beyond the firewall so as to allow inbound data traffic to flow, via the Internet and the relay server cluster, from at least one remote web-access client device outside of the LAN and beyond the firewall to the private server apparatus behind the firewall, the method comprising:
   requesting and retrieving, by at least one processor at the private server apparatus, via the Internet, records associated with a first Device Access Services (DAS) server and a second DAS server;
   selecting and designating, by the at least one processor, one of the first DAS server and the second DAS server as the elected DAS server and designating the non-elected DAS server as the failover DAS server;
   transmitting, by the at least one processor via at least one communication interface of the private server apparatus, a first request to the elected DAS server over a first external port number, wherein the first request body contains a second external port number, and further wherein the first request causes the elected DAS server to establish a first reverse encrypted tunnel for data transfer on the second external port number for facilitating data transfer between the private server apparatus and the elected DAS server;
   monitoring, by the at least one processor, the at least one communication interface to determine if the first reverse encrypted tunnel for data transfer breaks;
   determining, by the at least one processor, that the first reverse encrypted tunnel for data transfer breaks;
   in response to the determination that the first reverse encrypted tunnel for data transfer breaks, transmitting, by the at least one processor via the at least one communication interface of the private server apparatus, a second request to the elected DAS server over the first external port number, wherein the second request body contains an updated external port number to communicate with the private server apparatus via the Internet;
   determining that the elected DAS server fails to respond to the second request;
   in response to the determination that the elected DAS server fails to respond to the second request, transmitting, by the at least one processor via the at least one communication interface of the private server apparatus, a third request to the failover DAS server over the first external port number, for a failover external port number of the failover DAS server used to communicate with the private server apparatus via the Internet;
   determining that the failover DAS server responds to the third request; and
   in response to the determination that the failover DAS server responds to the third request, transmitting, by the at least one processor via the at least one communication interface of the private server apparatus, a fourth request to the failover DAS server to open a second reverse encrypted tunnel for data transfer between the private server apparatus and the failover DAS server using the failover external port number of the failover DAS server, wherein the second reverse encrypted tunnel for data transfer serves as the at least one secure communication link between the private server apparatus and the failover DAS server to allow the inbound data traffic to flow from the at least one remote web-access client device to the private server apparatus.

12. The method of claim 11, further comprising:
   transmitting, by the at least one processor via the at least one communication interface of the private server apparatus, via the Internet and to the elected DAS server, at least a portion of a first domain name alias for the private server apparatus to be used by the at least one remote web-access client device to access the private server apparatus via the relay server cluster and the at least one secure communication link.

13. The method of claim 11, wherein the portion of the first domain name alias includes a Media Access Control (MAC) address for the private server apparatus.

14. The method of claim 11, wherein the elected DAS server is configured to forward the at least a portion of the first domain name alias to at least one Domain Name System (DNS) server to update at least one DNS record stored at said at least one DNS server to include the at least a portion of the first domain name alias.

15. The method of claim 11, wherein the at least one DNS record stored at said at least one DNS server comprises at least one Canonical Name (CNAME) record.

16. The method of claim 11, wherein the records associated with the first DAS server and the second DAS server comprise Domain Name System (DNS) text records retrieved from a DNS server.

17. The method of claim 11, wherein monitoring the at least one communication interface to determine if the first reverse encrypted tunnel for data transfer breaks comprises sending periodic tunnel status messages.

18. The method of claim 17, further comprising determining that no tunnel status message is received from the elected DAS server within a predetermined period, wherein the first reverse encrypted tunnel is determined to have broken in response to the determination that no tunnel status message is received from the elected DAS server within the predetermined period.

19. The method of claim 18, wherein the predetermined period is greater than or equal to 20 seconds and less than or equal to 30 seconds.

20. The method of claim 19, wherein selecting and designating one of the first DAS server and the second DAS server as the elected DAS server and designating the non-elected DAS server as the failover DAS server is done randomly.

* * * * *